United States Patent
Mueck et al.

(10) Patent No.: US 10,616,899 B2
(45) Date of Patent: Apr. 7, 2020

(54) RADIO RESOURCE MANAGER DEVICES AND RADIO COMMUNICATION DEVICES

(71) Applicant: Intel Deutschland GmbH, Neubiberg (DE)

(72) Inventors: Markus Mueck, Unterhaching (DE); Christian Drewes, Germering (DE); Wen Xu, Neubiberg (DE)

(73) Assignee: Intel Deutschland GmbH, Neubiberg (DE)

( * ) Notice: Subject to any disclaimer, the term of this patent is extended or adjusted under 35 U.S.C. 154(b) by 0 days.

(21) Appl. No.: 15/861,131

(22) Filed: Jan. 3, 2018

(65) Prior Publication Data
US 2018/0132250 A1     May 10, 2018

Related U.S. Application Data

(63) Continuation of application No. 14/830,397, filed on Aug. 19, 2015, now Pat. No. 9,888,481, which is a continuation of application No. 12/561,557, filed on Sep. 17, 2009, now Pat. No. 9,144,077.

(51) Int. Cl.
*H04W 72/08* (2009.01)

(52) U.S. Cl.
CPC ................ *H04W 72/082* (2013.01)

(58) Field of Classification Search
CPC . H04W 72/082; H04W 88/06; H04W 52/367; H04W 16/14; H04W 28/16
USPC ...................................... 455/64.1
See application file for complete search history.

(56) References Cited

U.S. PATENT DOCUMENTS

| | | | |
|---|---|---|---|
| 6,195,554 B1 | 2/2001 | H'mimy et al. | |
| 6,223,041 B1 | 4/2001 | Egner et al. | |
| 6,418,327 B1 | 7/2002 | Carey et al. | |
| 9,144,077 B2 | 9/2015 | Mueck et al. | |
| 9,888,481 B2 | 2/2018 | Mueck et al. | |
| 10,397,934 B2 | 8/2019 | Mueck et al. | |
| 2004/0028003 A1* | 2/2004 | Diener | H04L 1/0001 370/319 |
| 2004/0190640 A1 | 9/2004 | Dubuc et al. | |
| 2007/0026864 A1 | 2/2007 | Singh | |

(Continued)

FOREIGN PATENT DOCUMENTS

| | | |
|---|---|---|
| CN | 1738277 A | 2/2006 |
| CN | 101040470 A | 9/2007 |

(Continued)

OTHER PUBLICATIONS

"U.S. Appl. No. 15/861,111, Non Final Office Action dated Jan. 7, 2019", 9 pgs.

(Continued)

*Primary Examiner* — Shaima Q Aminzay
(74) *Attorney, Agent, or Firm* — Schwegman Lundberg & Woessner, P.A.

(57) ABSTRACT

In an embodiment, a radio resource manager device is provided. The radio resource manager device may include a receiver configured to receive an application applying for radio resources; an interference allowance determiner configured to determine whether interference of signal transmission during radio communication using radio resources is allowed; and a radio resource assigner configured to assign radio resources based on the determined interference allowance.

15 Claims, 20 Drawing Sheets

(56) References Cited

U.S. PATENT DOCUMENTS

| | | | |
|---|---|---|---|
| 2008/0031197 A1 | 2/2008 | Wang et al. | |
| 2008/0130483 A1 | 6/2008 | Khandekar et al. | |
| 2008/0233967 A1* | 9/2008 | Montojo | H04W 72/082 455/452.2 |
| 2009/0143070 A1 | 6/2009 | Shu et al. | |
| 2009/0161617 A1 | 6/2009 | Abedi | |
| 2009/0288139 A1 | 11/2009 | Huber et al. | |
| 2010/0173667 A1 | 7/2010 | Hui et al. | |
| 2011/0065446 A1 | 3/2011 | Mueck et al. | |
| 2016/0044687 A1 | 2/2016 | Mueck et al. | |
| 2018/0132249 A1 | 5/2018 | Mueck et al. | |
| 2018/0324813 A1 | 11/2018 | Mueck et al. | |
| 2018/0324814 A1 | 11/2018 | Mueck et al. | |

FOREIGN PATENT DOCUMENTS

| | | |
|---|---|---|
| CN | 101198142 A | 6/2008 |
| CN | 105744633 A | 7/2016 |
| CN | 102026385 B | 6/2017 |
| CN | 105744633 | 9/2019 |

OTHER PUBLICATIONS

"Chinese Application Serial No. 201610036640.7, Response Filed Jan. 4, 2019 to Office Action dated Aug. 20, 2018", w/English Claims, 29 pgs.
"U.S. Appl. No. 15/861,111, Notice of Allowance dated Apr. 4, 2019", 9 pgs.
"U.S. Appl. No. 15/861,111, Response filed Mar. 13, 2019 to Non-Final Office Action dated Jan. 7, 2019", 8 pgs.
"Chinese Application Serial No. 201610036640.7, Office Action dated Jan. 16, 2019", w/English Translation, 8 pgs.
"Chinese Application Serial No. 201610036640.7, Response filed Mar. 19, 2019 to Office Action dated Jan. 16, 2019", w/ English Claims, 13 pgs.
U.S. Appl. No. 16/038,931, filed Jul. 18, 2018, Radio Resource Manager Devices and Radio Communication Devices.
U.S. Appl. No. 16/038,965, filed Jul. 18, 2018, Radio Resource Manager Devices and Radio Communication Devices.
"U.S. Appl. No. 16/038,931, Preliminary Amendment filed Jul. 19, 2018", 13 pgs.
"U.S. Appl. No. 16/038,965, Preliminary Amendment filed Jul. 19, 2018", 11 pgs.
"Chinese Application Serial No. 201610036640.7, Office Action dated Aug. 20, 2018", 5 pgs.
"U.S. Appl. No. 12/561,557, Final Office Action dated Feb. 4, 2014", 19 pgs.
"U.S. Appl. No. 12/561,557, Non Final Office Action dated Jul. 17, 2013", 17 pgs.
"U.S. Appl. No. 12/561,557, Non Final Office Action dated Sep. 2, 2014", 8 pgs.
"U.S. Appl. No. 12/561,557, Non Final Office Action dated Nov. 30, 2012", 18 pgs.
"U.S. Appl. No. 12/561,557, Notice of Allowance dated May 18, 2015", 10 pgs.
"U.S. Appl. No. 12/561,557, Response filed Mar. 28, 2013 to Non Final Office Action dated Nov. 30, 2012", 17 pgs.
"U.S. Appl. No. 12/561,557, Response filed Aug. 4, 2014 to Final Office Action dated Feb. 4, 2014", 7 pgs.
"U.S. Appl. No. 12/561,557, Response filed Oct. 17, 2013 to Non Final Office Action dated Jul. 17, 2013", 18 pgs.
"U.S. Appl. No. 12/561,557, Response filed Dec. 2, 2014 to Non Final Office Action dated Sep. 2, 2014", 9 pgs.
"U.S. Appl. No. 12/561,557, Supplemental Amendment filed Mar. 29, 2013", 17 pgs.
"U.S. Appl. No. 14/830,397, Advisory Action dated Aug. 17, 2017", 3 pgs.
"U.S. Appl. No. 14/830,397, Final Office Action dated Jun. 1, 2017", 16 pgs.
"U.S. Appl. No. 14/830,397, Non Final Office Action dated Nov. 30, 2016", 20 pgs.
"U.S. Appl. No. 14/830,397, Notice of Allowance dated Sep. 27, 2017", 12 pgs.
"U.S. Appl. No. 14/830,397, Preliminary Amendment filed Nov. 5, 2015", 10 pgs.
"U.S. Appl. No. 14/830,397, Response filed Feb. 17, 2017 to Non Final Office Action dated Nov. 30, 2016", 12 pgs.
"U.S. Appl. No. 14/830,397, Response filed Aug. 31, 2017 to Advisory Action dated Aug. 17, 2017", 12 pgs.
"U.S. Appl. No. 14/830,397, Response fled Jul. 28, 2017 to Final Office Action dated Jun. 1, 2017", 11 pgs.
"Chinese Application Serial No. 201010287423.8, Notice of Reexamination dated Mar. 10, 2016", Without English Translation, 5 pgs.
"Chinese Application Serial No. 201010287423.8, Office Action dated Jan. 18, 2013", (With English Translation), 14 pgs.
"Chinese Application Serial No. 201010287423.8, Office Action dated Apr. 4, 2014", not in English, 4 pgs.
"Chinese Application Serial No. 201010287423.8, Office Action dated Sep. 17, 2013", w/English Translation, 12 pgs.
"Chinese Application Serial No. 201010287423.8, Office Action dated Dec. 15, 2016", w/English Claims, 8 pgs.
"Chinese Application Serial No. 201010287423.8, Response filed Apr. 25, 2016 to Notice of Reexamination dated Mar. 10, 2016", W/ English Translation of Claims, 22 pgs.
"Chinese Application Serial No. 201010287423.8, Response filed Jun. 3, 2013 to Office Action dated Jan. 18, 2013", w/ English Translation, 14 pgs.
"Chinese Application Serial No. 201010287423.8, Response filed Dec. 2, 2013 to Office Action dated Sep. 17, 2013", w/ English Translation, 7 pgs.
"Chinese Application Serial No. 201010287423.8, Resposne filed Jan. 6, 2017 to Office Action dated Dec. 15, 2016", w/ English Claims, 19 pgs.
"Korean Application Serial No. 2010-0090973, Office Action dated Feb. 18, 2013", (With English Translation), 3 pgs.
"Korean Application Serial No. 2010-0090973, Office Action dated Jun. 28, 2012", English Translated version, 3 pgs.
"Physical layer aspects for evolved Universal Terrestrial Radio Access", 3GPP TR 25.814 V7.1.0, (2006), 132 pgs.
"Physical layer aspects for evolved Universal Terrestrial Radio Access", Chapter 7 only—resubmission for examiner with a more specific section 3GPP TR 25.814 V7.1.0, (2006), 49 pgs.
Hai, Jiang, et al., "Distributed Medium Access Control for Next Generation CDMA Wireless Networks", (Jun. 30, 2007).
"U.S. Appl. No. 15/861,111, Corrected Notice of Allowability dated May 30, 2019", 2 pgs.
"U.S. Appl. No. 15/861,111, Notice of Allowability dated Jun. 26, 2019", 2 pgs.
"U.S. Appl. No. 15/861,111, Notice of Allowability dated Jul. 24, 2019", 2 pgs.
"U.S. Appl. No. 16/038,931, Non Final Office Action dated Jun. 27, 2019", 17 pgs.
"U.S. Appl. No. 16/038,965, Non Final Office Action dated Jun. 28, 2019", 16 pgs.
"U.S. Appl. No. 16/038,931, Response filed Sep. 24, 2019 to Non-Final Office Action dated Jun. 27, 2019", 13 pgs.
"U.S. Appl. No. 16/038,965, Response filed Sep. 30, 2019 to Non Final Office Action dated Jun. 28, 2019", 13 pgs.
"U.S. Appl. No. 15/861,111, Preliminary Amendment filed Jan. 4, 2018", 8 pgs.
"Chinese Application Serial No. 201610036640.7, Voluntary Amendment filed on Dec. 29, 2017", (W/ English Claims), 36 pgs.

* cited by examiner

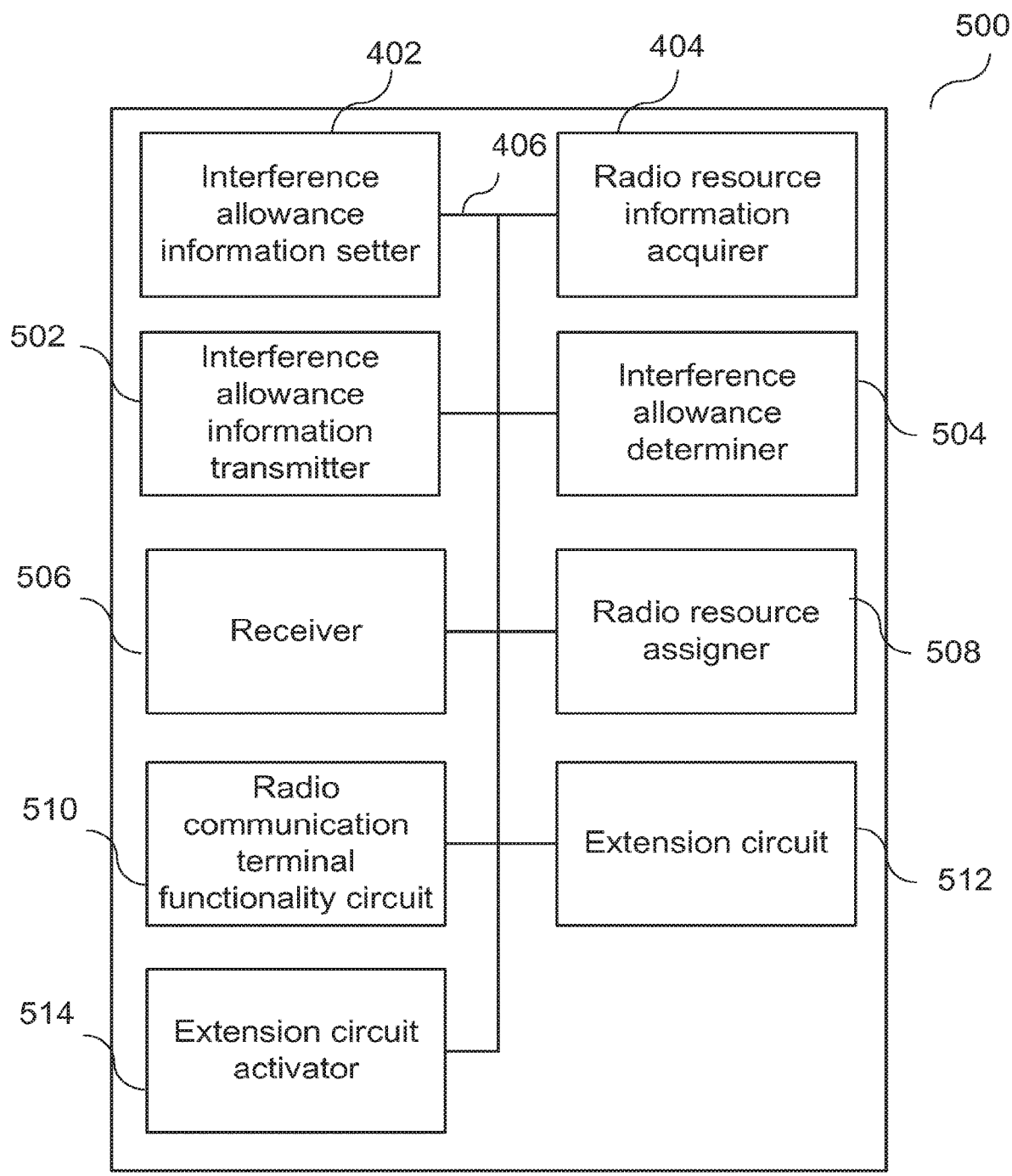

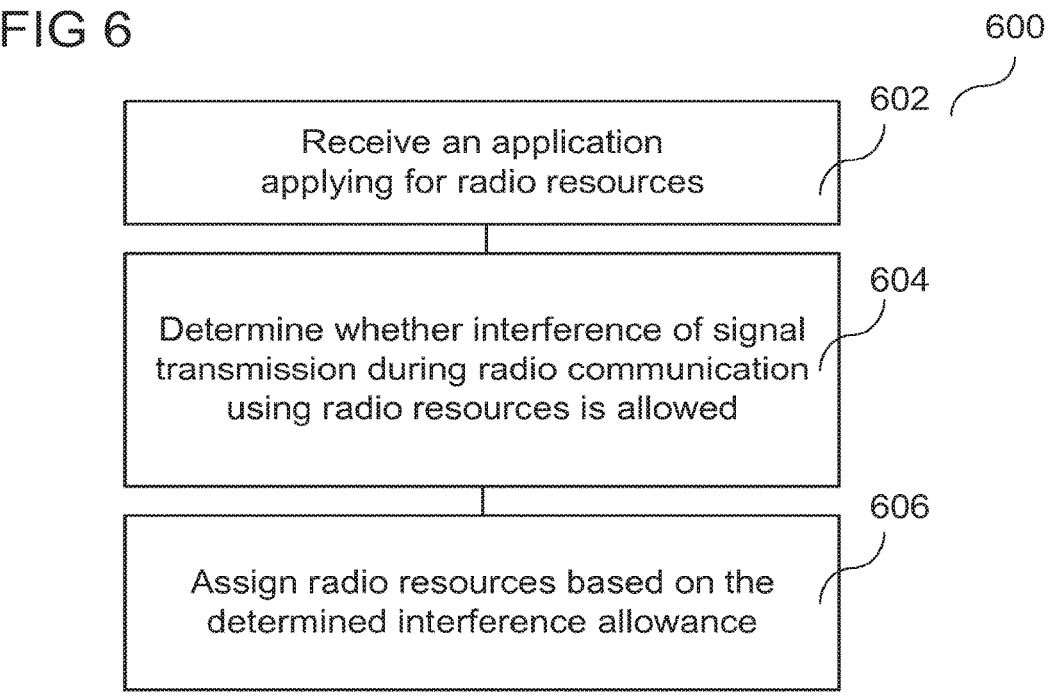
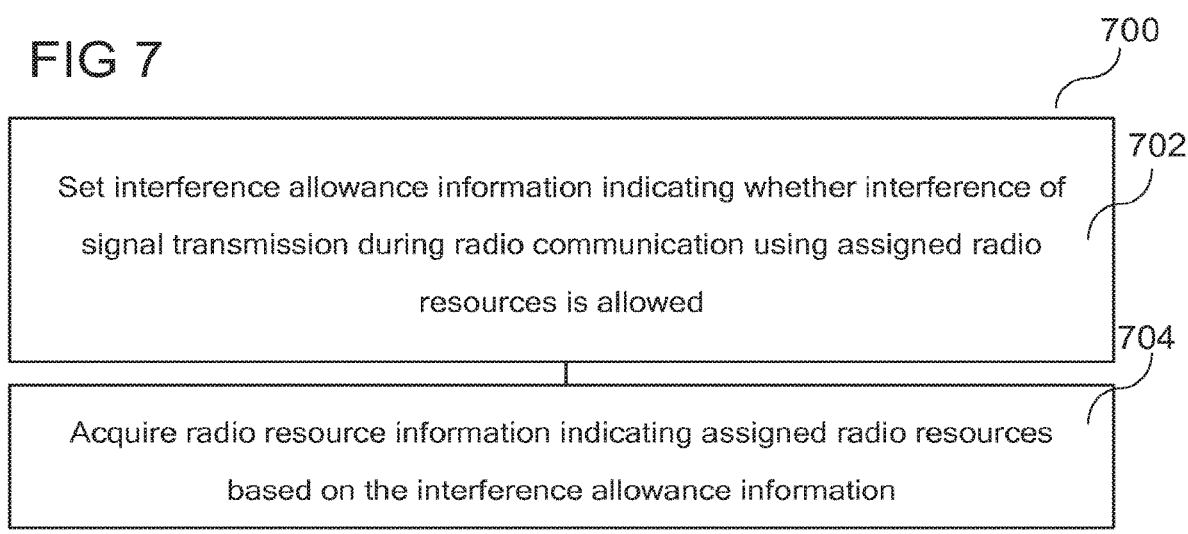

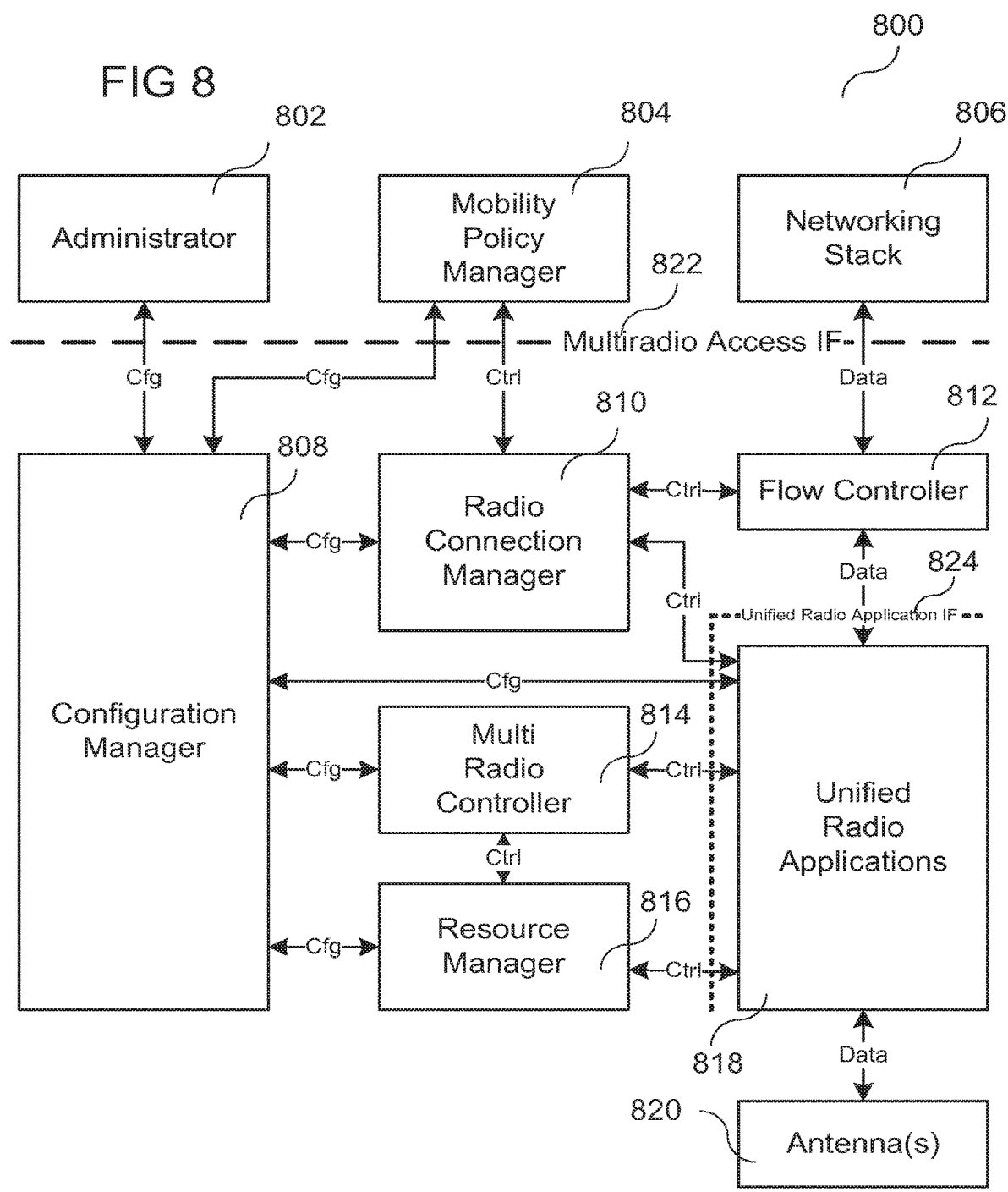

RADIO RESOURCE MANAGER DEVICES AND RADIO COMMUNICATION DEVICES

CROSS-REFERENCE TO RELATED APPLICATION

This application is a continuation of U.S. patent application Ser. No. 14/830,397, filed Aug. 19, 2015, which is a continuation of U.S. patent application Ser. No. 12/561,557, filed Sep. 17, 2009, now issued as U.S. Pat. No. 9,144,077, both of which are incorporated by reference herein in their entirety.

TECHNICAL FIELD

Various embodiments relate generally to radio resource manager devices and radio communication devices.

BACKGROUND

Femto Cells (FC) or Femto Cell Base Stations (FC BS) may be broadly deployed in the near future, enabling operators to off-load CAPEX (Capital expenditures) and OPEX (Operational expenditure) to users. In particular, users may contribute to the acquisition of Base Station (BS) equipment by purchasing Femto Cell BS (FC-BS) and they will contribute to the operating costs by paying the energy bill. From a technical perspective, such a deployment may be desired in order to achieve the ultra-high data rates which 3GPP LTE (Third Generation Partnership Project Long Term Evolution), 3GPP LTE-Advanced, IEEE 802.16m, etc. are capable of. These systems may provide very high data rate occupying a broad spectrum; in order to keep the output power of the concerned BS and UE (User Equipment) reasonably low while exploiting the full potential, small cells need to be provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a radio communication device in accordance with an embodiment;

FIG. 6 shows a flow diagram illustrating a radio resource management method in accordance with an embodiment;

FIG. 7 shows a flow diagram illustrating a method for controlling a radio communication device in accordance with an embodiment;

FIG. 8 shows an architecture of a reconfigurable radio system;

DESCRIPTION

Figure 1:
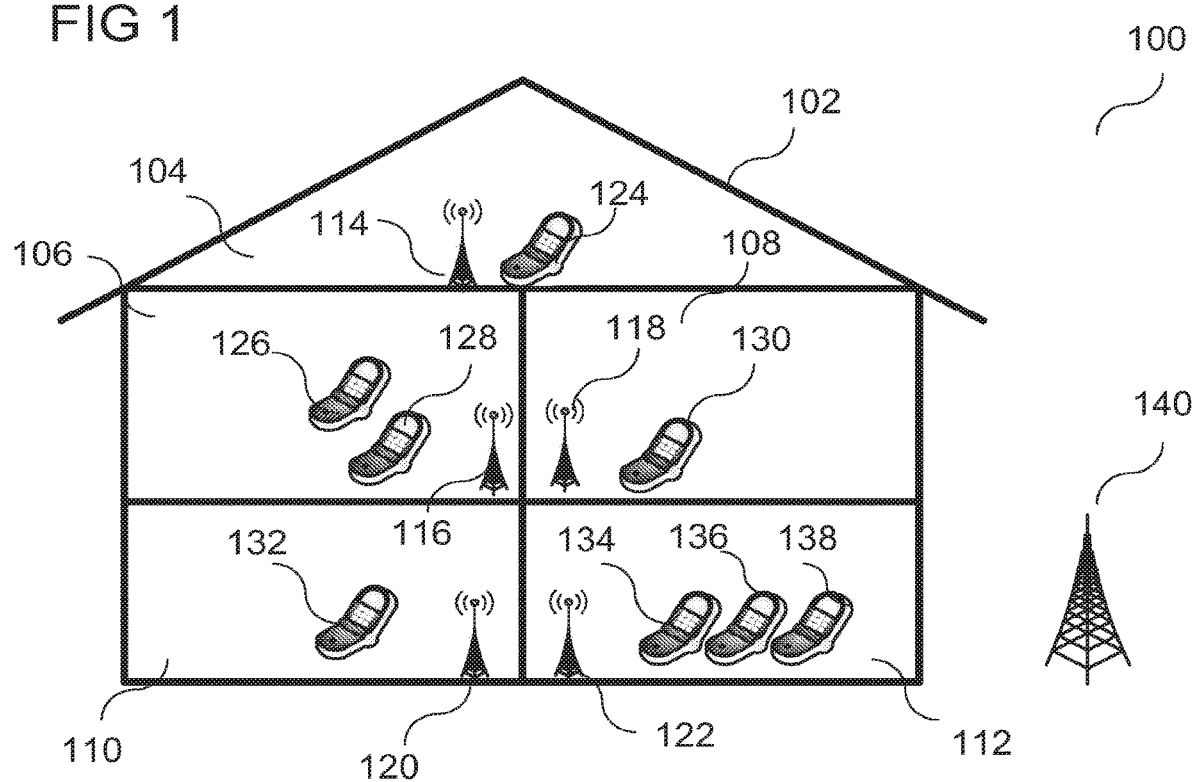
FIG. 1 shows a deployment scenario according to various embodiments.

In various embodiments, femto cell base stations, like described in more detail below, may be operated close to each other. In various embodiments, radio resources, like described in more detail below, may be assigned to the femto cell base stations. In various embodiments, there may be femto cell base stations, for which interference, as explained in more detail below, may be acceptable or allowed, and there may be femto cell base stations, for which interference may be necessary to be strictly avoided. In an implementation, radio resources may be assigned to each of the femto cell base stations based on whether interference is acceptable for the femto cell base station or not. In an implementation, for the femto cell base stations accepting interference, overlapping radio resources may be assigned, which may lead to interference in communication of those femto cell base stations, and which may lead to a better overall usage of radio resources. In an implementation, for the femto cell base stations for which interference is to be strictly avoided, radio resources may be exclusively assigned to each of those femto cell base stations, which may lead to a communication without interference for those femto cell base stations.

The following detailed description refers to the accompanying drawings that show, by way of illustration, specific details and embodiments in which the invention may be practiced. These embodiments are described in sufficient detail to enable those skilled in the art to practice the invention. In this regard, directional terminology, such as "top", "bottom", "front", "back", "leading", "trailing", etc, is used with reference to the orientation of the Figure(s) being described. Because components of embodiments can be positioned in a number of different orientations, the directional terminology is used for purposes of illustration and is in no way limiting. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

A radio communication device according to various embodiments may be a device configured for wireless communication. In various embodiments, a radio communication device may be an end-user mobile device (MD). In various embodiments, a radio communication device may be any kind of mobile telephone, personal digital assistant, mobile computer, or any other mobile device configured for communication with a mobile communication base station or an access point and may be also referred to as a User Equipment (UE). In various embodiments, a radio communication device may be a femto cell base station or a Home Node B base station. In various embodiments, advanced base stations (advanced BS, ABS) and advanced mobile stations (advanced MS, AMS) in accordance with IEEE 802.16m may be incorporated.

The radio resource manager device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

The radio communication device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

In various embodiments, the mobile radio communication device may be configured as a home base station, e.g. as a Home NodeB, e.g. as a Home (e)NodeB. In an example, a 'Home NodeB' may be understood in accordance with 3GPP as a trimmed-down version of a cellular mobile radio base station optimized for use in residential or corporate environments (e.g., private homes, public restaurants or small office areas). In various examples throughout this description, the terms 'Home Base Station', 'Home NodeB', 'Home eNodeB', 'Femto Cell', 'Femto Cell Base Station' are referring to the same logical entity and will be used interchangeably throughout the entire description. FC-BS may be provided in accordance with a 3GPP standard, but may also be provided for any other mobile radio communication standard, for example for IEEE 802.16m.

The so-called 'Home Base Station' concept shall support receiving and initiating cellular calls at home, and uses a broadband connection (typically DSL, cable modem or fibre optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A mobile radio cell which indicates being a CSG Cell may need to provide its CSG Identity to the mobile radio communication terminal devices (e.g. the UEs). Such a mobile radio cell may only be suitable for a mobile radio communication terminal device if its CSG Identity is e.g. listed in the mobile radio communication terminal device's CSG white list (a list of CSG Identities maintained in the mobile radio communication terminal device or in an associated smart card indicating the mobile radio cells which a particular mobile radio communication terminal device is allowed to use for communication). In various embodiments, a home base station may be a consumer device that is connected to the mobile radio core network via fixed line (e.g. DSL) or wireless to a mobile radio macro cell. It may provide access to legacy mobile devices and increase the coverage in buildings and the bandwidth per user. In various embodiments, a home base station may be run in open or closed mode. In closed mode the home base station may provide access to a so-called closed subscriber group (CSG) only. Examples for such closed subscriber groups are families or some or all employees of a company, for example.

As a 'Femto Cell' entity or 'Home Base Station' entity will usually be a box of small size and physically under control of the user, in other words, out of the MNO's domain, it could be used nomadically, i.e. the user may decide to operate it in his apartment, but also in a hotel when he is away from home, e.g. as a business traveler. Additionally a 'Home NodeB' may be operated only temporarily, i.e. it can be switched on and off from time to time, e.g. because the user does not want to operate it over night or when he leaves his apartment.

Various embodiments are provided for devices, and various embodiments are provided for methods. It will be understood that basic properties of the devices also hold for the methods and vice versa. Therefore, for sake of brevity, duplicate description of such properties may be omitted.

FIG. 1 shows a deployment scenario 100 according to various embodiments. In the scenario 100, a building 102 with several rooms 104, 106, 108, 110, 112 (in general with several portions of the building) is shown. A radio communication device, such as for example a femto cell base station, may be provided in each room (in general in each portion of the building). A first radio communication device 114 may be provided in a first room 104. A second radio communication device 116 may be provided in a second room 106. A third radio communication device 118 may be provided in a third room 108. A fourth radio communication device 120 may be provided in a fourth room 110. A fifth radio communication device 122 may be provided in a fifth room 112. In each of the rooms, further radio communication devices, such as end-user mobile devices (MD), such as user equipment (UE), may be operated. In the first room 104, a sixth radio communication device 124 may be operated. In the second room 106, a seventh radio communication device 126 and an eighth radio communication device 128 may be operated. In the third room 108, a ninth radio communication device 130 may be operated. In the fourth room 110, a tenth radio communication device 132 may be operated. In the fifth room 112, an eleventh radio communication device 134, a twelfth radio communication device 136, and a thirteenth radio communication device 138 may be operated. A radio base station, such as a macro cell base station, such as a legacy radio base station, may be provided outside the house 102.

Although FIG. 1 shows a deployment like it may be present in a home deployment or an office scenario, it is to be understood, that the application of various embodiments is not restricted to such a scenario. Various embodiments may be applied whenever radio communication devices are present.

Femto Cells (FC) or Femto Cell Base Stations (FC BS) may be broadly deployed in the near future, enabling operators to off-load CAPEX and OPEX to users. Users may contribute to the acquisition of Base Station (BS) equipment by purchasing Femto Cell BS (FC-BS) and they may contribute to the operating costs by paying the energy bill. Such a deployment may be provided in order to achieve the ultra-high data rates which 3GPP LTE, 3GPP LTE-Advanced, IEEE 802.16m, etc. are capable of. These systems may provide very high data rate occupying a broad spectrum; in order to keep the output power of the concerned BS and UE (User Equipment) reasonably low while exploiting the full potential, small cells may be provided.

Within a densely populated area, however, a large number of FC-BS may be deployed—for example, one FC-BS may be deployed per home (such as a privately owned flat in a high-rise building, etc.). In such a context, as illustrated below, the available spectrum may be largely insufficient if each FC-BS is controlling an entire cellular band.

In various embodiments, the situation of limited spectrum may be addressed by a hierarchical radio resource management (HRRM) approach. The HRRM approach according to various embodiments may be applied to 3GPP LTE, or any other radio communication technology as stated below. According to various embodiments, each radio communication device, for example each FC-BS, may be assigned a sub-set of the available data slots for up/downlink. The assignment of radio resources to the UE attached to such a radio communication device, for example FC-BS, may be limited to operate within the given sub-set. According to various embodiments, the available resources may be finely split among a large number of available areas provided by radio communication devices, such as Femto Cells.

According to various embodiments, a framework for interference management for Femto-Cell Base Stations (FC-BS) is provided.

According to various embodiments, a realization is provided of a radio communication device that may be operated a FC-BS or as a UE, i.e. a Dual Mode FC BS/UE, and the integration of a hierarchical radio resource management (HRRM) into a device providing such a dual mode.

According to various embodiments, spectrum assignment to radio communication devices, for example Femto-Cell BS, in a dense deployment of a large number of radio communication devices, for example FC-BS, may be provided.

For spectrum assignment to Femto-Cell BS in a dense deployment of a large number of FC-BS, commonly two approaches are considered:

1) Power level adaptation, i.e. reducing the Femto-Cell coverage so much that the available spectrum may be shared among FC-BS without causing interference (or minimizing the resulting level of interference);

2) Sharing the available spectrum among the FC-BS as long as sufficient spectrum is available. In this case, one channel may be entirely dedicated to a FC-BS.

In both approaches, in the context of a very dense FC-BS deployment, the power level adaptation may lead to a very limited coverage of FC-BS, such that even near-by user device may function at modes of low spectral efficiency and thus delivering poor QoS (Quality of Service). The approach of sharing the available spectrum among the various FC-BS may be inherently becoming impossible with a high number of deployed FC-BS (under the assumption that each FC-BS may obtain an entire channel of up to 20 MHz Bandwidth).

In various embodiments, a hierarchical radio resource management (HRRM) approach is provided as described herein.

In various embodiments, the integration of the HRRM into an architecture for a dual mode device that may operate as a femto-cell BS and UE is provided. In various embodiments, the integration of a HRRM unit into an architecture for a dual mode device that may operate as a femto-cell BS and UE is provided.

According to various embodiments, an optimum distribution of resources among multiple client devices, for example FC-BS, may be achieved: Depending on the requirements of the various client devices, a resource distribution without or with a partial level of controlled interference may be allowed. This may lead to a better usage of the available resources compared to existing solutions.

According to various embodiments, a new client device, for example a new FC-BS, may be added into a client device framework, for example a FC-BS framework. An efficient process for identifying suitable resources for newly entering client device may be provided in various embodiments.

According to various embodiment, a client device, for example a FC-BS, may be removed from a client device framework, for example a FC-BS framework. An efficient process for re-distributing freed resources may be provided in various embodiments.

According to various embodiments, the integration of Radio Resource Management (RRM) functionalities into a dual mode FC-BS/UE device may be provided: The approach may enable manufacturers to build a dual mode FC-BS/UE device exploiting an existing UE SDR architecture.

Figure 2:
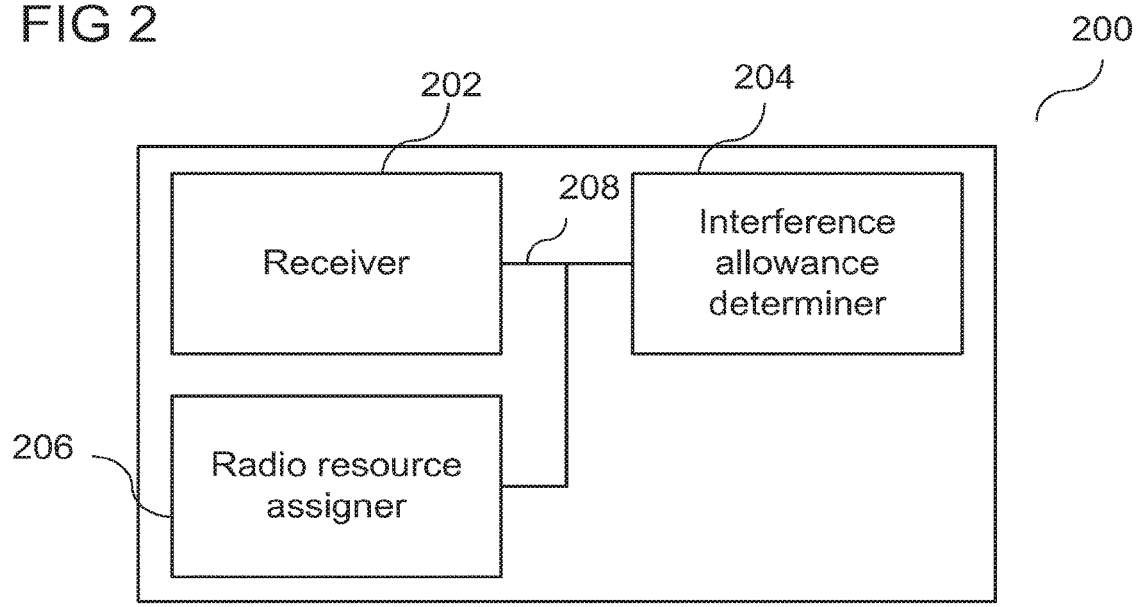
FIG. 2 shows a radio resource manager device in accordance with an embodiment.

FIG. 2 shows a radio resource manager device 200 in accordance with an embodiment. The radio resource manager device 200 may include a receiver 202 configured to receive an application applying for radio resources; an interference allowance determiner 204 configured to determine whether interference of signal transmission during radio communication using radio resources is allowed; and a radio resource assigner 206 configured to assign radio resources based on the determined interference allowance. The receiver 202, the interference allowance determiner 204 and the radio resource assigner 206 may be coupled with each other, e.g. via an electrical connection 208 such as e.g. a cable or a computer bus or via any other suitable electrical connection to exchange electrical signals.

It will be understood that in various embodiments, determining may be understood as making a determination depending on the current situation. In various embodiments, determining does not mean having a fixed assignment of determination, which does not change but remains constant all the time.

In various embodiments, the interference allowance determiner 204 may operate based on the current radio context. In various embodiments, the radio resource assigner 206 may operate based on the current radio context.

In various embodiments, the receiver 202 may further be configured to receive an application of a client device applying for radio resources. In various embodiments, the interference allowance determiner 204 may further be configured to determine whether interference of signal transmission during radio communication using radio resources assigned to the client device is allowed for the client device. In various embodiments, the radio resource assigner 206 may further be configured to assign radio resources to the client device based on the determined interference allowance of the client device.

In various embodiments, interference of signal transmission may be understood in a way that the transmission of a signal leads to interference with another transmission.

The interference allowance determiner 204 may be configured to determine whether interference of signal transmission during radio communication using radio resources assigned to the client device is allowed for the client device based on an information acquired from a database, which may store interference allowance information of each client device, i.e. the database may store a relation between an identifier for identification of the client device and interference allowance information indicating whether interference of signal transmission during radio communication using radio resources assigned to the client device is allowed for the client device.

In various embodiments, the radio resource manager device 200 may provide an efficient data exchange meeting the QoS (for example data rate) requirements of the users.

In various embodiments, the radio resource manager device 200 (in various embodiments for example the radio resource assigner 206 in the radio resource manager device 200) may be configured to i) check whether the QoS requirements can be met without introducing interference, ii) If a solution can be found for i) without introducing interference, the corresponding resource assignment may be used, otherwise a resource assignment may be used that leads to a low level of interference in order to minimize the corresponding loss of system capacity, iii) If FC-BS leave the system, the correspondingly unused resource elements may be redistributed—this may lead to a complete reconsideration of the resource assignment and a previously interference-dominated system may become (nearly) interference-free, iv) if the resource requirements of some FC-BS change, also an overall reassignment of resources to FC-BS may be considered.

It is to be noted that "interference" in accordance with various embodiments is different from the "interference" in typical wireless cellular networks. In existing cellular networks, inter-cell interference may occur if cells are neighboring and the signals are somehow overlapping. Typically, the resulting interference levels may be low. This may be not the type of interference that may occur in accordance with various embodiments—according to various applications of various embodiments, a very dense (and typically chaotic) femto-cell deployment may be considered (since user may put their femto cells anywhere, this may lead to a chaotic deployment). Therefore, the interference levels may be potentially very strong which may lead to a very different case compared to the traditional neighboring cell-interference case. In various embodiments, as will be explained in more detail below, the radio resource manager device 200 may resources to the various FC-BS such that the interfering FC-BS may be positioned far from each other. The radio resource manager 200 may ensure that the interference characteristics get close to the traditional cell-interference case; however, it may not always be possible.

In various embodiments, the radio resource manager device 200 may be applied to a dense FC-BS deployment. In various embodiments, the radio resource manager device 200 may be operated in a dense FC-BS deployment.

Figure 3:
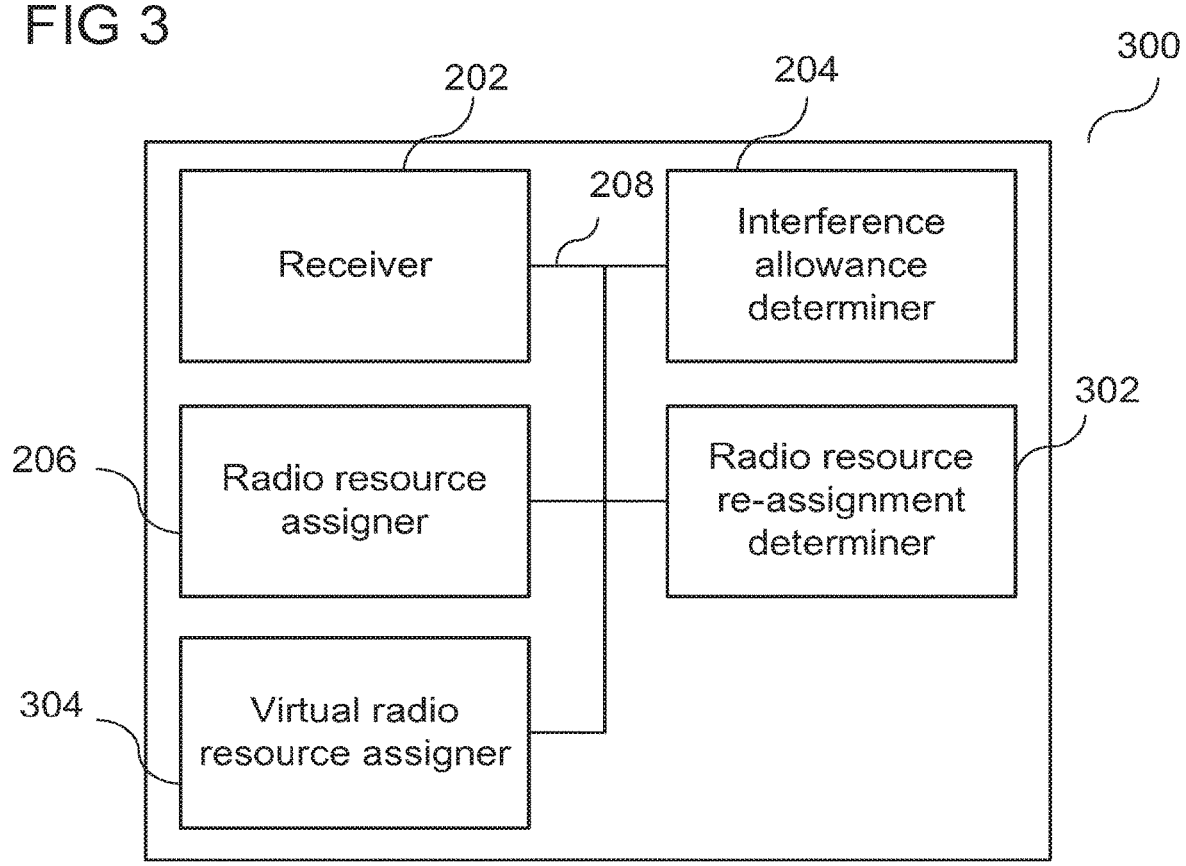
FIG. 3 shows a radio resource manager device in accordance with an embodiment.

FIG. 3 shows a radio resource manager device 300 in accordance with an embodiment. The radio resource manager device 300, similarly to the radio resource manager device 200 of FIG. 2, may include a receiver 202 configured to receive an application applying for radio resources; an interference allowance determiner 204 configured to determine whether interference of signal transmission during radio communication using radio resources is allowed; and a radio resource assigner 206 configured to assign radio resources based on the determined interference allowance. The radio resource manager device 300 may further include a radio resource re-assignment determiner 302, as will be explained in more detail below. The radio resource manager device 300 may further include a virtual radio resource assigner 304, as will be explained in more detail below. The receiver 202, the interference allowance determiner 204, the radio resource assigner 206, the radio resource re-assignment determiner 302, and the virtual radio resource assigner 304 may be coupled with each other, e.g. via an electrical connection 208 such as e.g. a cable or a computer bus or via any other suitable electrical connection to exchange electrical signals.

In various embodiments, the receiver 202 may further be configured to receive an application of a client device applying for radio resources. In various embodiments, the interference allowance determiner 204 may further be configured to determine whether interference of signal transmission during radio communication using radio resources assigned to the client device is allowed for the client device. In various embodiments, the radio resource assigner 206 may further be configured to assign radio resources to the client device based on the determined interference allowance of the client device.

In various embodiments, the radio resource manager device 300 may include a radio resource re-assignment determiner 302 configured to determine whether a re-assignment of radio resources is to be performed.

In various embodiments, the radio resource re-assignment determiner 302 may be configured to determine whether a re-assignment of radio resources is to be performed based on whether a client device newly applies for radio resources. In case a client device newly applies for radio resources, radio resources that the radio resource manager device 300 has previously assigned to other client devices, may be re-assigned by the radio resource manager device 300.

In various embodiments, the radio resource re-assignment determiner 302 may be configured to determine whether a re-assignment of radio resources is to be performed based on whether a client device resigns from using the radio resources assigned to the client device resigning from using the radio resources. In case a client device does not use the radio resources the radio resource manager device 300 has assigned to it anymore, the respective radio resources may be re-assigned by the radio resource manager device 300.

In various embodiments, the radio resource re-assignment determiner 302 may be configured to determine whether a re-assignment of radio resources is to be performed based on whether information on whether interference is allowed for a client device, to which the radio resource manager 300 has assigned radio resources, has changed. In case information on whether interference is allowed for a client device changes, the radio resource manager device 300 may re-assign radio resources, both to the client device for which the information on whether interference is allowed has changed, and also for other client devices.

In various embodiments, the radio resource re-assignment determiner 302 may be configured to determine that re-assignment of radio resources is to be performed based on any kind of trigger, for example a trigger from any kind of network element.

In various embodiments, the radio resource manager device 300 may further include a virtual radio resource assigner 304 configured to compute an assignment of radio resources to a client device. The radio resource re-assignment determiner 302 may be configured to determine whether a re-assignment of radio resources is to be performed based on the result of the virtual radio resource assigner 304.

In various embodiments, the radio resource manager device 300 may further include a radio resource re-assigner (not shown) configured to re-assign radio resources based on the result of the radio resource re-assignment determiner 302.

In various embodiments, the radio resource manager device 300 may further include a radio resource re-assigner configured to re-assign radio resources based on the assignment of radio resources computed by the virtual radio resource assigner 304.

In various embodiments, the radio resources may include distinct sub-areas in the frequency-time plane, as explained in more detail below.

In various embodiments, the radio resources may include resource elements, as will be explained in more detail below.

In various embodiments, the radio resources may include 3GPP LTE resource elements, as will be explained in more detail below.

In various embodiments, the radio resource assigner 206 may further be configured to assign radio resources exclusively to the client device, in case the determined interference allowance indicates that interference is not allowed for the client device.

In various embodiments, the radio resource assigner may further be configured to assign radio resources non-exclusively to the client device, in case the determined interference allowance indicates that interference is allowed for the client device.

In various embodiments, the radio resource manager device 300 may further include a location determiner (not shown) configured to determine the location of the client device. In various embodiments, the radio resource assigner may be further configured to assign radio resources non-exclusively to the client device based on the determined location of the client device, in case the determined interference allowance indicates that interference is allowed for the client device.

In various embodiments, the radio resource manager device 300 may further include an already-assigned radio resources information manager (not shown) configured to record information indicating the radio resources assigned to at least one client device In various embodiments, the radio resource manager device 300 may further include an interference estimator (not shown) configured to estimate interference of signal transmission during radio communication using the same radio resources at different pre-determined locations.

In various embodiments, the radio resource assigner may further be configured in case of assigning the same radio resources non-exclusively to at least two client devices to choose the at least two client devices so that the estimated interference between the at least two client devices is below a threshold value.

In various embodiments, the radio resource assigner 206 may further be configured in case of assigning the same radio resources non-exclusively to at least two client devices to choose the at least two client devices so that the estimated interference between the at least two client devices is a minimum value over all possible assignments.

In various embodiments, the radio resource assigner 206 may further be configured in case of assigning the same radio resources non-exclusively to at least two client devices to choose the at least two client devices based on the relative location of the client devices.

In various embodiments, the radio resource assigner 206 may further be configured to choose the at least two client devices so that the distance between the at least two client devices is higher than a pre-determined threshold value.

In various embodiments, the radio resource assigner 206 may further be configured to choose the at least two client devices so that the distance between the at least two client devices is higher than the distance between any two of the two client devices and a plurality of other client devices applying for radio resources.

In various embodiments, the radio resource assigner 206 may further be configured to assign radio resources of different carrier frequencies to at least one client device applying for radio resources.

In various embodiments, the radio resource assigner 206 may further be configured to assign radio resources of different carrier frequencies to neighboring client devices applying for radio resources.

Figure 4:
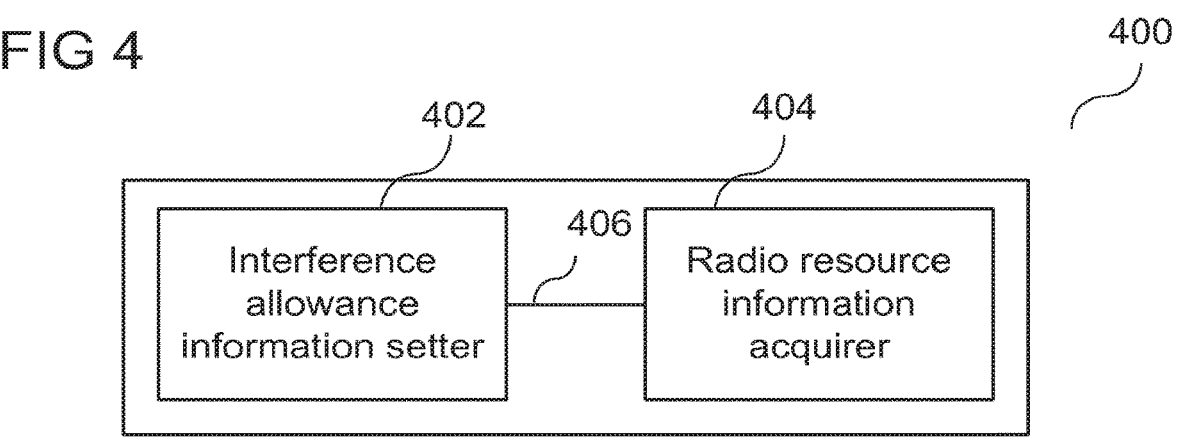
FIG. 4 shows a radio communication device in accordance with an embodiment.

FIG. 4 shows a radio communication device 400 in accordance with an embodiment. The radio communication device 400 may include an interference allowance information setter 402 configured to set interference allowance information indicating whether interference of signal transmission during radio communication using assigned radio resources is allowed, and a radio resource information acquirer 404 configured to acquire radio resource information indicating assigned radio resources based on the interference allowance information. The interference allowance information setter 402 and the radio resource information acquirer 404 may be coupled with each other, e.g. via an electrical connection 406 such as e.g. a cable or a computer bus or via any other suitable electrical connection to exchange electrical signals.

In various embodiments, the interference allowance information setter 402 may further be configured to set interference allowance information indicating whether interference of signal transmission during radio communication using radio resources assigned to the radio communication device 400 is allowed for the radio communication device 400. In various embodiments, the radio resource information acquirer 404 may further be configured to acquire radio resource information indicating radio resources assigned to the radio communication device 400 based on the interference allowance information.

FIG. 5 shows a radio communication device 500 in accordance with an embodiment. The radio communication device 500, similarly to the radio communication device 400 of FIG. 4, may include an interference allowance information setter 402 configured to set interference allowance information indicating whether interference of signal transmission during radio communication using radio resources is allowed, and a radio resource information acquirer 404 configured to acquire radio resource information indicating assigned radio resources based on the interference allowance information. The radio communication device 500 may further include an interference allowance information transmitter 502, as will be explained in more detail below. The radio communication device 500 may further include an interference allowance determiner 504, as will be explained in more detail below. The radio communication device 500 may further include a receiver 506, as will be explained in more detail below. The radio communication device 500 may further include a radio resource assigner 508, as will be explained in more detail below. The radio communication device 500 may further include a radio communication terminal functionality circuit 510, as will be explained in more detail below. The radio communication device 500 may further include an extension circuit 512, as will be explained in more detail below. The radio communication device 500 may further include an extension circuit activator 514, as will be explained in more detail below. The interference allowance information setter 402, the radio resource information acquirer 404, the interference allowance information transmitter 502, the interference allowance determiner 504, the receiver 506, the radio resource assigner 508, the radio communication terminal functionality circuit 510, the extension circuit 512, and the extension circuit activator 514 may be coupled with each other, e.g. via an electrical connection 406 such as e.g. a cable or a computer bus or via any other suitable electrical connection to exchange electrical signals.

In various embodiments, the interference allowance information setter 402 may further be configured to set interference allowance information indicating whether interference of signal transmission during radio communication using radio resources assigned to the radio communication device 500 is allowed for the radio communication device 500. In various embodiments, the radio resource information acquirer 404 may further be configured to acquire radio resource information indicating radio resources assigned to the radio communication device 500 based on the interference allowance information.

In various embodiments, the radio communication device 500 be configured according to at least one of the following radio communication technologies: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), the public safety standard TETRA (Terrestrial Trunked Radio), ETSI (European Telecommunications Standards Institute) TS (Technical Specification) 101 376 (Geo-Mobile Radio GMR-1 3G (Third Generation)), and various satellite communication standards.

In various embodiments, the radio communication device 500 may further include an interference allowance information transmitter 502 configured to transmit the interference allowance information set in the interference allowance information setter 402 to a radio resource manager device. In various embodiments, the radio resource information acquirer 404 may further be configured to acquire the radio resource information from the radio resource manager device.

In various embodiments, the interference allowance information transmitter 502 may further be configured to re-transmit the interference allowance information in case the interference allowance information is changed in the interference allowance information setter 402.

In various embodiments, the radio communication device 500 may be configured to provide radio communication terminal functionality.

In various embodiments, the radio communication device 500 may be configured according to an ETSI (European Telecommunications Standards Institute) RRS (Reconfigurable Radio Systems) Architecture of a user equipment, as will be explained in more detail below.

In various embodiments, the radio communication device 500 may be an end-user mobile device.

In various embodiments, the radio communication device 500 may be a user-equipment.

In various embodiments, the radio communication device 500 may be a radio communication terminal.

In various embodiments, radio communication device 500 may be a mobile station.

In various embodiments, the radio communication device 500 may be configured to provide femto cell base station functionality.

In various embodiments, the radio communication device 500 may be configured to provide Home Node B functionality.

In various embodiments, the radio communication device 500 may be configured to provide Home Node B functionality.

In various embodiments, the radio communication device 500 may be configured to provide radio access using the assigned radio resources to a further radio communication device.

In various embodiments, the radio communication device 500 may be configured to provide the functionality of a radio communication manager device as described above and below. For example, the radio communication device 500 may be a femto cell base station, which may assign the radio resources it has been assign by a radio resource manager device of the network operator's network two client devices such a MD or UE in a similar way it has been assigned the radio resources.

In various embodiments, the radio communication device 500 may include a receiver 506 configured to receive an application applying for radio resources; an interference allowance determiner 506 configured to determine whether interference of signal transmission during radio communication using radio resources is allowed; and a radio resource assigner 508 configured to assign radio resources based on the determined interference allowance.

In various embodiments, the receiver 506 of the radio communication device 500 may further be configured to receive an application of a client device applying for radio resources. In various embodiments, the interference allowance determiner 506 of the radio communication device 500 may further be configured to determine whether interference of signal transmission during radio communication using radio resources assigned to the client device is allowed for the client device. In various embodiments, the radio resource assigner 508 of the radio communication device 500 may further be configured to assign radio resources to the client device based on the determined interference allowance of the client device.

The interference allowance determiner 504 of the radio communication device 500 may be configured to determine whether interference of signal transmission during radio communication using radio resources assigned to the client device is allowed for the client device based on an information acquired from a database, which may store interference allowance information of each client device, i.e. the database may store a relation between an identifier for identification of the client device and interference allowance information indicating whether interference of signal transmission during radio communication using radio resources assigned to the client device is allowed for the client device.

In various embodiments, the radio communication device 500 may include a radio resource re-assignment determiner (not shown) configured to determine whether a re-assignment of radio resources is to be performed.

In various embodiments, the radio resource re-assignment determiner of the radio communication device 500 may be configured to determine whether a re-assignment of radio resources is to be performed based on whether a client device newly applies for radio resources. In case a client device newly applies for radio resources, radio resources that the radio communication device 500 has previously assigned to other client devices, may be re-assigned by the radio communication device 500.

In various embodiments, the radio resource re-assignment determiner of the radio communication device 500 may be configured to determine whether a re-assignment of radio resources is to be performed based on whether a client device resigns from using the radio resources assigned to the client device resigning from using the radio resources. In case a client device does not use the radio resources the radio resource manager device of the radio communication device 500 has assigned to it anymore, the respective radio resources may be re-assigned by the radio communication device 500.

In various embodiments, the radio resource re-assignment determiner of the radio communication device 500 may be configured to determine whether a re-assignment of radio resources is to be performed based on whether information on whether interference is allowed for a client device, to which the radio communication device 500 has assigned radio resources, has changed. In case information on whether interference is allowed for a client device changes, the radio communication device 500 may re-assign radio resources, both to the client device for which the information on whether interference is allowed has changed, and also for other client devices.

In various embodiments, the radio communication device 500 may further include a virtual radio resource assigner (not shown) configured to compute an assignment of radio resources to a client device. The radio resource re-assignment determiner of the radio communication device 500 may be configured to determine whether a re-assignment of radio resources is to be performed based on the result of the virtual radio resource assigner of the radio communication device 500.

In various embodiments, the radio communication device 500 may further include a radio resource re-assigner (not shown) configured to re-assign radio resources based on the result of the radio resource re-assignment determiner of the radio communication device 500.

In various embodiments, the radio communication device 500 may further include a radio resource re-assigner (not shown) configured to re-assign radio resources based on the assignment of radio resources computed by the virtual radio resource assigner of the radio communication device 500.

In various embodiments, the radio resources may include distinct sub-areas in the frequency-time plane, as explained in more detail below.

In various embodiments, the radio resources may include resource elements, as will be explained in more detail below.

In various embodiments, the radio resources may include 3GPP LTE resource elements, as will be explained in more detail below.

In various embodiments, the radio resource assigner 508 of the radio communication device 500 may further be configured to assign radio resources exclusively to the client device, in case the determined interference allowance indicates that interference is not allowed for the client device.

In various embodiments, the radio resource assigner 508 of the radio communication device 500 may further be configured to assign radio resources non-exclusively to the client device, in case the determined interference allowance indicates that interference is allowed for the client device.

In various embodiments, the radio communication device 500 may further include a location determiner (not shown) configured to determine the location of the client device. In various embodiments, the radio resource assigner 508 of the radio communication device 500 may further be configured to assign radio resources non-exclusively to the client device based on the determined location of the client device, in case the determined interference allowance indicates that interference is allowed for the client device.

In various embodiments, the radio communication device 500 may further include an already-assigned radio resources information manager (not shown) configured to record information indicating the radio resources assigned to at least one client device In various embodiments, the radio communication device 500 may further include an interference estimator (not shown) configured to estimate interference of signal transmission during radio communication using the same radio resources at different pre-determined locations.

In various embodiments, the radio resource assigner of the radio communication device 500 may further be configured in case of assigning the same radio resources non-exclusively to at least two client devices to choose the at least two client devices so that the estimated interference between the at least two client devices is below a threshold value.

In various embodiments, the radio resource assigner 508 of the radio communication device 500 may further be configured in case of assigning the same radio resources non-exclusively to at least two client devices to choose the at least two client devices so that the estimated interference between the at least two client devices is a minimum value over all possible assignments.

In various embodiments, the radio resource assigner 508 of the radio communication device 500 may further be configured in case of assigning the same radio resources non-exclusively to at least two client devices to choose the at least two client devices based on the relative location of the client devices.

In various embodiments, the radio resource assigner 508 of the radio communication device 500 may further be configured to choose the at least two client devices so that the distance between the at least two client devices is higher than a pre-determined threshold value.

In various embodiments, the radio resource assigner 508 of the radio communication device 500 may further be configured to choose the at least two client devices so that the distance between the at least two client devices is higher than distance between any two of the two client devices and a plurality of other client devices applying for radio resources.

In various embodiments, the radio resource assigner 508 of the radio communication device 500 may further be configured to assign radio resources of different carrier frequencies to at least one client device applying for radio resources.

In various embodiments, the radio resource assigner 508 of the radio communication device 500 may further be configured to assign radio resources of different carrier frequencies to neighboring client devices applying for radio resources.

In various embodiments, the radio communication device 500 may further include a location information transmitter (not shown) configured to transmit information indicating the location of the radio communication device to the radio resource manager.

In various embodiments, the interference allowance information setter may further be configured to set the interference allowance information according to an instruction of the user of the radio communication device 500.

In various embodiments, the interference allowance information setter may further be configured to set the interference allowance information according to quality of service requirements of the radio communication device 500.

In various embodiments, the interference allowance information setter may further be configured to set the interference allowance information according to an instruction of a user of the client device.

In various embodiments, the interference allowance information setter may further be configured to set the interference allowance information according to quality of service requirements of the client device.

In various embodiments, the radio resources may include distinct sub-areas in the frequency-time plane.

In various embodiments, the radio resources may include resource elements.

In various embodiments, the radio resources may include 3GPP LTE resource elements.

In various embodiments, the radio communication device 500 may further include a radio communication terminal functionality circuit 510 configured to provide radio communication terminal functionality, as explained in more detail below.

In various embodiments, the radio communication device 500 may further include an extension circuit 512 configured to provide radio base station functionality using the radio communication terminal functionality circuit, as explained in more detail below.

In various embodiments, the extension circuit 512 may include a gateway access circuit configured to provide access to a radio base station gateway in a radio communication network, as explained in more detail below.

In various embodiments, the radio communication device 500 may further include an extension circuit activator 514 configured to activate the extension circuit, as explained in more detail below.

By selectively activating or de-activating the extension circuit 512, the extension circuit activator 514 may determine the operation mode of the radio communication device 500. In case the extension circuit activator 514 controls the extension circuit 512 to be de-activated, the radio communication device 500 may perform operation according to a radio communication terminal (for example a MD or a UE) using the radio communication terminal functionality circuit 510. In case the extension circuit activator 514 controls the extension circuit 512 to be activated, the radio communication device 500 may perform operation according to a radio base station (for example a femto cell base station, or for example a Home Node B, or for example an eHome Node B) using the radio communication terminal functionality circuit 510 and in addition the extension circuit 512.

In an embodiment, a radio resource manager device may be provided. The radio resource manager device may be configured to assign radio resources to a client device applying for radio resources based on whether interference of signal transmission during radio communication using radio resources assigned to the client device is allowed for the client device.

In an embodiment, a radio communication device may be provided. The radio communication device may be configured to acquire radio resource information indicating radio resources assigned to the radio communication device based on whether interference of signal transmission during radio communication using radio resources assigned to the client device is allowed for the client device.

In an embodiment, a radio resource manager device may be provided. In various embodiments, the radio resource manager device may be configured to assign radio resources of different carrier frequencies to at least one client device applying for radio resources. In various embodiments, the radio resource manager device may be further configured to assign radio resources of different carrier frequencies to neighboring client devices applying for radio resources.

FIG. 6 shows a flow diagram 600 illustrating a radio resource management method in accordance with an embodiment. In 602, an application applying for radio resources may be received. In various embodiments, an application of a client device applying for radio resources may be received. In 604, it may be determined whether interference of signal transmission during radio communication using radio resources is allowed. In various embodiments, it may be determined whether interference of signal transmission during radio communication using radio resources assigned to the client device is allowed for the client device. In 606, radio resources may be assigned based on the determined interference allowance. In various embodiments, radio resources may be assigned to the client device based on the determined interference allowance of the client device.

It will be understood that in various embodiments, determining may be understood as making a determination depending on the current situation. In various embodiments, determining does not mean having a fixed assignment of determination, which does not change but remains constant all the time.

In various embodiments, the determining whether interference is allowed may be performed based on the current radio context. In various embodiments, assignment of radio resources may be performed based on the current radio context.

In 604, it may be determined whether interference of signal transmission during radio communication using radio resources assigned to the client device is allowed for the client device based on an information acquired from a database, which may store interference allowance information of each client device, i.e. the database may store a relation between an identifier for identification of the client device and interference allowance information indicating whether interference of signal transmission during radio communication using radio resources assigned to the client device is allowed for the client device.

In various embodiments, it may be determined whether a re-assignment of radio resources is to be performed.

In various embodiments, it may be determined whether a re-assignment of radio resources is to be performed based on whether a client device newly applies for radio resources. In case a client device newly applies for radio resources, radio resources that have previously been assigned, may be re-assigned.

In various embodiments, it may be determined whether a re-assignment of radio resources is to be performed based on whether a client device resigns from using the radio resources assigned to the client device resigning from using the radio resources. In case a client device does not use the radio resources that have been assigned to it, the respective radio resources may be re-assigned.

In various embodiments, it may be determined whether a re-assignment of radio resources is to be performed based on whether information on whether interference is allowed for a client device, to which radio resources have been assigned, has changed. In case information on whether interference is allowed for a client device changes, radio resources may be re-assigned, both to the client device for which the information on whether interference is allowed has changed, and also for other client devices.

In various embodiments, a resource attribution process when a new FC-BS is added may be provided. In various embodiments, a resource attribution process when a FC-BS is switched off may be provided.

In various embodiments, an assignment of radio resources to a client device may be computed. It may be determined whether a re-assignment of radio resources is to be performed based on the assignment computation result.

In various embodiments, radio resources may be re-assigned based on the re-assignment determination.

In various embodiments, radio resources may be re-assigned based on the computed assignment of radio resources.

In various embodiments, the radio resources may include distinct sub-areas in the frequency-time plane, as explained in more detail below.

In various embodiments, the radio resources may include resource elements, as will be explained in more detail below.

In various embodiments, the radio resources may include 3GPP LTE resource elements, as will be explained in more detail below.

In various embodiments, radio resources may be assigned exclusively to the client device, in case the determined interference allowance indicates that interference is not allowed for the client device.

In various embodiments, radio resources may be assigned non-exclusively to the client device, in case the determined interference allowance indicates that interference is allowed for the client device.

In various embodiments, the location of the client device may be determined. In various embodiments, radio resources may be assigned non-exclusively to the client device based on the determined location of the client device, in case the determined interference allowance indicates that interference is allowed for the client device.

In various embodiments, information indicating the radio resources assigned to at least one client device may be recorded.

In various embodiments, interference of signal transmission during radio communication using the same radio resources at different pre-determined locations may be estimated.

In various embodiments, in case of assigning the same radio resources non-exclusively to at least two client devices, the at least two client devices may be chosen so that the estimated interference between the at least two client devices is below a threshold value.

In various embodiments, in case of assigning the same radio resources non-exclusively to at least two client devices, the at least two client devices may be chosen so that the estimated interference between the at least two client devices is a minimum value over all possible assignments.

In various embodiments, in case of assigning the same radio resources non-exclusively to at least two client devices, the at least two client devices may be chosen based on the relative location of the client devices.

In various embodiments, the at least two client devices may be chosen so that the distance between the at least two client devices is higher than a pre-determined threshold value.

In various embodiments, the at least two client devices may be chosen so that the distance between the at least two client devices is higher than the distance between any two of the two client devices and a plurality of other client devices applying for radio resources.

In various embodiments, radio resources of different carrier frequencies may be assigned to at least one client device applying for radio resources.

In various embodiments, radio resources of different carrier frequencies may be assigned to neighboring client devices applying for radio resources.

FIG. 7 shows a flow diagram 700 illustrating a method for controlling a radio communication device in accordance with an embodiment. In 702, interference allowance information indicating whether interference of signal transmission during radio communication using assigned radio resources is allowed may be set. In various embodiments, interference allowance information indicating whether interference of signal transmission during radio communication using radio resources assigned to the radio communication device is allowed for the radio communication device may be set. In 704, radio resource information indicating assigned radio resources may be acquired based on the interference allowance information. In various embodiments, radio resource information indicating radio resources assigned to the radio communication device may be acquired based on the interference allowance information In various embodiments, the interference allowance information set in the interference allowance information setter may be transmitted to a radio resource manager device. In various embodiments, the radio resource information may be acquired from the radio resource manager device.

In various embodiments, the interference allowance information may be re-transmitted in case the interference allowance information is changed in the interference allowance information setting step 702.

In various embodiments, radio communication terminal functionality may be provided.

In various embodiments, functionality according to an ETSI RSS Architecture of a user equipment, as will be explained in more detail below, may be provided.

In various embodiments, the radio communication device may be an end-user mobile device.

In various embodiments, the radio communication device may be a user-equipment.

In various embodiments, the radio communication device may be a radio communication terminal.

In various embodiments, radio communication device may be a mobile station.

In various embodiments, femto cell base station functionality may be provided.

In various embodiments, Home Node B functionality may be provided.

In various embodiments, Home eNode B functionality may be provided.

In various embodiments, radio access using the assigned radio resources to a further radio communication device may be provided.

In various embodiments, the functionality of a radio communication management method as described above and below may be provided. For example, the radio communication device may operate as a femto cell base station, which may assign the radio resources it has been assign by a radio resource manager device of the network operator's network to client devices such a MD or UE in a similar way it has been assigned the radio resources.

In various embodiments, an application applying for radio resources may be received; it may be determined whether interference of signal transmission during radio communication using radio resources is allowed; and radio resources may be assigned based on the determined interference allowance.

In various embodiments, an application of a client device applying for radio resources may be received; it may be determined whether interference of signal transmission during radio communication using radio resources assigned to the client device is allowed for the client device; and radio resources may be assigned to the client device based on the determined interference allowance of the client device.

In various embodiments, it may be determined whether interference of signal transmission during radio communication using radio resources assigned to the client device is allowed for the client device based on an information acquired from a database, which may store interference allowance information of each client device, i.e. the database may store a relation between an identifier for identification of the client device and interference allowance information indicating whether interference of signal transmission during radio communication using radio resources assigned to the client device is allowed for the client device.

In various embodiments, it may be determined whether a re-assignment of radio resources is to be performed.

In various embodiments, it may be determined whether a re-assignment of radio resources is to be performed based on whether a client device newly applies for radio resources. In case a client device newly applies for radio resources, radio resources that have previously been assigned to other client devices, may be re-assigned.

In various embodiments, it may be determined whether a re-assignment of radio resources is to be performed based on whether a client device resigns from using the radio resources assigned to the client device resigning from using the radio resources. In case a client device does not use the radio resources that have been assigned to it anymore, the respective radio resources may be re-assigned.

In various embodiments, it may be determined whether a re-assignment of radio resources is to be performed based on whether information on whether interference is allowed for a client device, to which radio resources have been assigned, has changed. In case information on whether interference is allowed for a client device changes, radio resources may be re-assigned, both to the client device for which the information on whether interference is allowed has changed, and also for other client devices.

In various embodiments, an assignment of radio resources to a client device may be computed. It may be configured to determine whether a re-assignment of radio resources is to be performed based on the computed resource assignment.

In various embodiments, radio resources may be re-assigned based on the re-assignment determination.

In various embodiments, radio resources may be re-assigned based on the computed resource assignment.

In various embodiments, the radio resources may include distinct sub-areas in the frequency-time plane, as explained in more detail below.

In various embodiments, the radio resources may include resource elements, as will be explained in more detail below.

In various embodiments, the radio resources may include 3GPP LTE resource elements, as will be explained in more detail below.

In various embodiments, radio resources may be assigned exclusively to the client device, in case the determined interference allowance indicates that interference is not allowed for the client device.

In various embodiments, radio resources may be assigned non-exclusively to the client device, in case the determined interference allowance indicates that interference is allowed for the client device.

In various embodiments, the location of the client device may be determined. In various embodiments, radio resources may be assigned non-exclusively to the client device based on the determined location of the client device, in case the determined interference allowance indicates that interference is allowed for the client device.

In various embodiments, information indicating the radio resources assigned to at least one client device may be recorded.

In various embodiments, interference of signal transmission during radio communication using the same radio resources at different pre-determined locations may be estimated.

In various embodiments, in case of assigning the same radio resources non-exclusively to at least two client devices, the at least two client devices may be chosen so that the estimated interference between the at least two client devices is below a threshold value.

In various embodiments, in case of assigning the same radio resources non-exclusively to at least two client devices, the at least two client devices may be chosen so that the estimated interference between the at least two client devices is a minimum value over all possible assignments.

In various embodiments, in case of assigning the same radio resources non-exclusively to at least two client devices, the at least two client devices may be chosen based on the relative location of the client devices.

In various embodiments, the at least two client devices may be chosen so that the distance between the at least two client devices is higher than a pre-determined threshold value.

In various embodiments, the at least two client devices may be chosen so that the distance between the at least two client devices is higher than the distance between any two of the two client devices and a plurality of other client devices applying for radio resources. In various embodiments, a geographic distance may be used as a measure for distance. In various embodiments, the 1-norm, the 2-norm, any n-norm with a natural number, or the infinity norm may be used as a measure for distance.

In various embodiments, radio resources of different carrier frequencies may be assigned to at least one client device applying for radio resources.

In various embodiments, radio resources of different carrier frequencies may be assigned to neighboring client devices applying for radio resources.

In various embodiments, information indicating the location of the radio communication device may be transmitted to the radio resource manager.

In various embodiments, the interference allowance information may be set according to an instruction of the user of the radio communication device.

In various embodiments, the interference allowance information may be set according to quality of service requirements of the radio communication device.

In various embodiments, the interference allowance information may be set according to an instruction of a user of the client device.

In various embodiments, the interference allowance information may be set according to quality of service requirements of the client device.

In various embodiments, the radio resources may include distinct sub-areas in the frequency-time plane.

In various embodiments, the radio resources may include resource elements.

In various embodiments, the radio resources may include 3GPP LTE resource elements.

In various embodiments, a radio communication terminal functionality may be provided by using a radio communication terminal functionality circuit, as explained in more detail below.

In various embodiments, a radio base station functionality may be provided by using an extension circuit in addition to using the radio communication terminal functionality circuit, as explained in more detail below.

In various embodiments, access may be provided to a radio base station gateway in a radio communication network, as explained in more detail below.

In various embodiments, the extension circuit may selectively be activated, as explained in more detail below.

By selectively activating or de-activating the extension circuit, the extension circuit activator may determine the operation mode of the radio communication device. In case the extension circuit activator controls the extension circuit to be de-activated, the radio communication device may perform operation according to a radio communication terminal (for example a MD or a UE) using the radio communication terminal functionality circuit. In case the extension circuit activator controls the extension circuit to be activated, the radio communication device may perform operation according to a radio base station (for example a femto cell base station, or for example a Home Node B, or for example an eHome Node B) using the radio communication terminal functionality circuit and in addition the extension circuit.

In an embodiment, a radio resource management method may be provided. In the method, radio resources may be assigned to a client device applying for radio resources based on whether interference of signal transmission during radio communication using radio resources assigned to the client device is allowed for the client device.

In an embodiment, a method for controlling a radio communication device may be provided. In the method, radio resource information may be acquired indicating radio resources assigned to the radio communication device based on whether interference of signal transmission during radio communication using radio resources assigned to the client device is allowed for the client device.

In an embodiment, a radio resource management method may be provided. In various embodiments of the method, radio resources of different carrier frequencies may be assigned to at least one client device applying for radio resources. In various embodiments of the method, radio resources of different carrier frequencies may be assigned to neighboring client devices applying for radio resources.

FIG. 8 shows an architecture 800 of a reconfigurable radio system (RRS) according to an ETSI RRS architecture (ETSI: European Telecommunications Standards Institute). In various embodiments, a approach as described above and below may be provided on an existing UE reconfigurable architecture. The architecture may include an administrator 802, a mobility policy manager 804, a networking stack 806, a configuration manager 808, a radio connection manager 810, a flow controller 812, a multi radio controller 814, a resource manager 816, unified radio applications 818, and one antenna 820 or more antennas 820. Exchange of control information is indicated by arrows denoted by "Ctrl". Exchange of configuration information is indicated by arrows denoted by "Cfg". Exchange of data information is indicated by arrows denoted by "Data".

All services of the device configured according to the architecture may provide all its services to the user applications at the Multiradio Access Interface 822. The services may include connectivity and data transfer, but also other kind of services like positioning and broadcasting services. User applications may access the device via networking stack 806 and mobility policy manager 804, which may maintain user preference policies for selecting radios. Additional services for installing new radio applications into the device may be available to an administrator user 802.

The Configuration Manager (CM) 808 may perform installation, de-installation, loading and unloading of radio applications into devices like radio computer as well as management of and access to the radio parameters of those radio applications.

The Radio Connection Manager (RCM) 810 may perform activation and deactivation of radio applications according to user requests and overall management of user data flows, which may also be switched from one radio application to another.

The Flow Controller (FC) 812 may send and receive user data packets and may control the flow.

The Multiradio Controller (MRC) 814 may perform scheduling the requests on spectrum resources issued by concurrently executing radio applications in order to detect in advance the interoperability problems between them.

The Resource Manager (RM) 816 may perform management of radio computer resources in order to share them among simultaneously active radio applications, while guaranteeing their real-time requirements.

The Unified Radio Applications 818 may include any application loaded onto a processor of a software defined radio (SDR) device.

The Unified Radio Application Interface (URAI) 824 may harmonize the behavior of radio applications towards the radio computer operating system. All radio applications may access and provide a well-defined set of services specified in the Unified Radio Application Interface 824.

Figure 9:
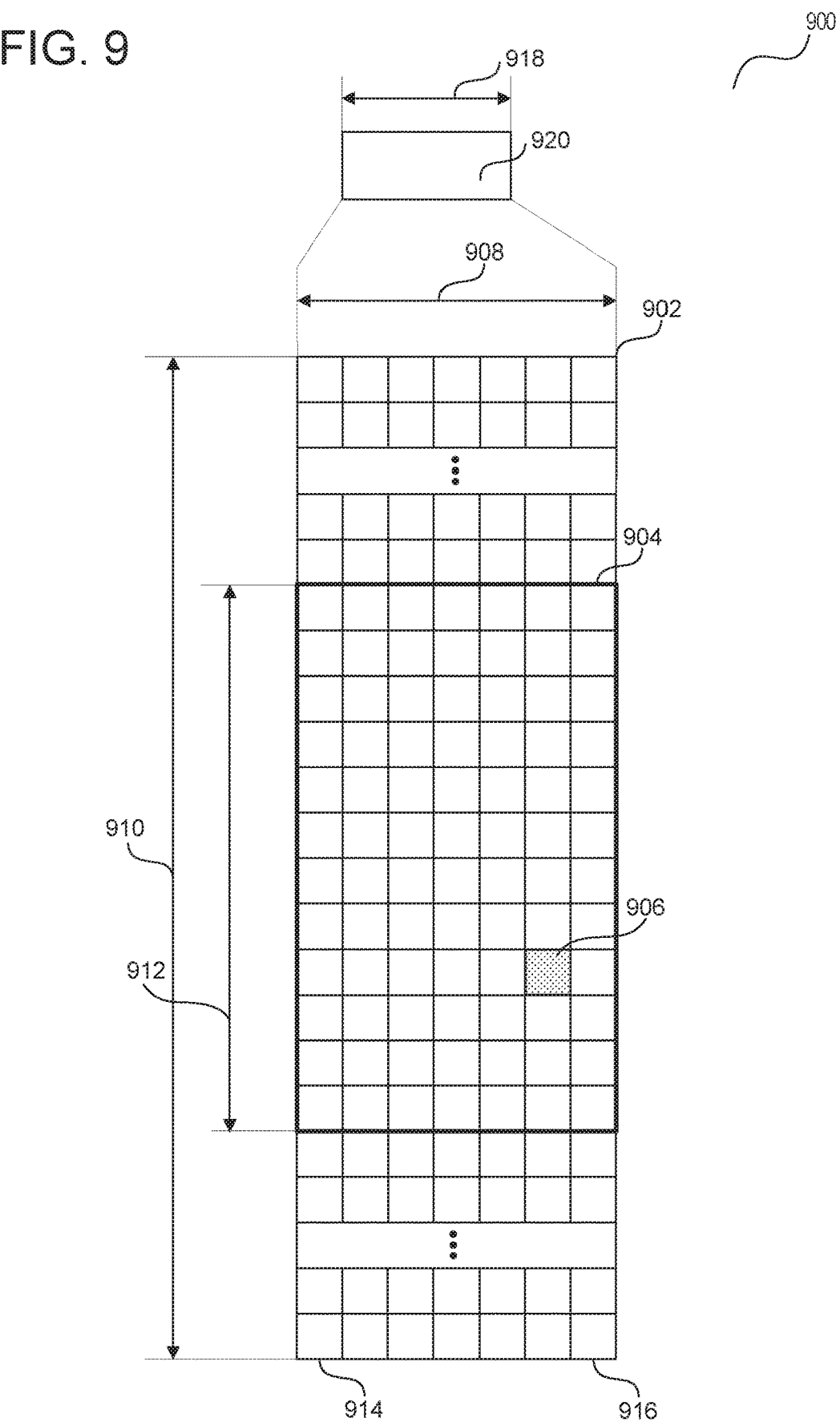
FIG. 9 shows a structure of radio resource elements in accordance with an embodiment.

FIG. 9 shows an example of a structure 900 of radio resource elements in accordance with an embodiment. The resource grid 902 is shown for one slot 920, for example one uplink slot, or for example for one downlink slot. The slot may have a time length of Tslot, indicated by reference numeral 918. The resource grid 902, which may be a resource grid of SC-FDMA symbols (SC-FDMA: Single-carrier frequency-division multiple access), for example, may consist of or include a number of SC-FDMA symbols in a first dimension, for example $N_{symb}^{UL}$ SC-FDMA symbols like indicated by reference numeral 908, and a number of subcarriers in a second dimension, for example $N_{RB}^{UL} \times N_{sc}^{RB}$ subcarriers like indicated by reference numeral 910. The resource grid may be divided into resource blocks. For example, one of the resource blocks 902 is indicated by the bold frame. Each resource block may include $N_{sc}^{RB}$ subcarriers, like indicated by reference numeral 912. The resource grid may include $N_{RB}^{UL}$ resource blocks. A resource blocks may include $N_{symb}^{UL} \times N_{sc}^{RB}$ pairs of one SC-FDMA symbol and one subcarrier. Such a pair may be a resource element. Each resource element 906 may be addressed by its indices (k,l), where l denotes the index of the SC-FDMA symbol and k denotes the index of the subcarrier. l may range from a value of l=0 for the left column (indicated by reference numeral 914) to a value of l=$N_{symb}^{UL}$-1 at the right column (indicated by reference numeral 916). A resource block may include $N_{symb}^{UL} \times N_{sc}^{RB}$ resource elements.

According to various embodiments, in accordance with IEEE 802.16e and IEEE 802.16m, a very similar concept of "Resource Blocks" may be used, which however uses other definitions and terminology. It will be understood that various embodiments may be applied to resource blocks in a similar way like described for resource elements.

According to various embodiments, the resources, for example resource elements, within one channel may be split among various client device, for example FC-BS. According to various embodiments, one specific radio resource, for example one resource element may be attributed to multiple client devices, instead of being attributed only to one single client device.

According to various embodiment, the selection process for client devices, for example FC-BS, to be attributed to radio resources, for example resource elements of one given channel, is detailed.

According to various embodiments, efficient resource management is provided if a novel client device, for example a novel FC-BS, enters the network.

According to various embodiments, efficient resource management is provided if a client device, for example a FC-BS, is switched off or leaves the network.

According to various embodiments, various possibilities of organizing the frame structure are provided such that multiple client devices, for example multiple FC-BS, can operate in parallel. According to various embodiments, this may involve mainly the signaling symbols which cannot be distributed onto orthogonal resource elements.

In various embodiments, a FC-BS may be considered that may be switched-off, for example, and the corresponding newly available resources may be used in order to reconsider the overall resource attribution to all FC-BS. In various embodiments, a new overall resource assignment may be provided in order to reduce the overall interference levels (assuming that no entirely interference free configuration may be possible for meeting the throughput requirements).

The number of available distinct channels (on distinct carrier frequencies) may be limited to a small number. It may be considered to be insufficient for a broad deployment of radio communication devices, for example FC-BS. According to various embodiment, not a whole channel (i.e. all "Resource Elements" within one "transmitted signal" as defined above) may be assigned to a given FC-BS, but only a fraction of it by assigning parts of the "Resource Elements" within a channel to multiple FC-BS.

According to various embodiments, the resources within one channel may be split among various radio communication devices, for example FC-BS. The entire set of "Resource Elements" as defined above and as illustrated in FIG. 9 may not necessarily be attributed to one single radio communication device, for example one single FC-BS, but they may be shared among multiple radio communication devices, for example multiple FC-BS. This may help to avoid interference on the data-parts by distributing the resource elements such that no interference may occur (in other words: an orthogonal distribution of resource elements).

Figure 10:
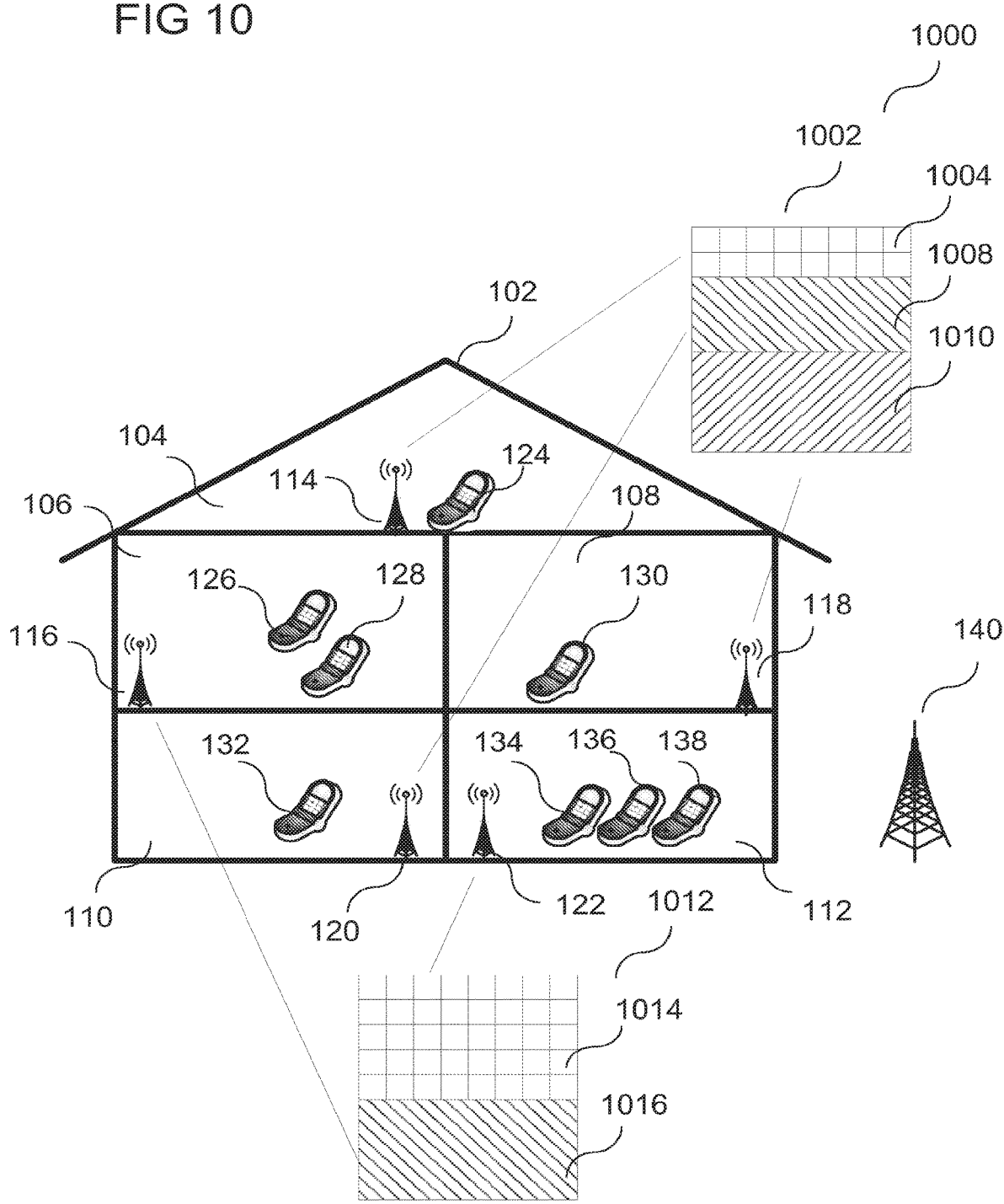
FIG. 10 shows a deployment scenario in accordance with an embodiment.

FIG. 10 shows a deployment scenario 1000 in accordance with an embodiment. The devices present in the scenario and the basic layout are the same as in the scenario 100 shown in FIG. 1. Therefore, description thereof is omitted. It is to be noted that the second radio communication device 116 and the third radio communication device 118 are shown to be at different locations compared to the scenario 100 shown in FIG. 1. The first to thirteenth radio communication devices may move freely; it will be explained below, how movement and thus entrance and exit of radio communication devices into service areas may be handled.

According to various embodiments, subsets of the available Resource Elements within one channel are attributed to a set of radio communication devices, for example FC-BS. In FIG. 10, this is illustrated for two channels ("transmitted signals") with different carrier frequencies.

A first channel 1002 may be provided to the first radio communication device 114, the third radio communication device 118 and the fourth radio communication device 120. Different resource elements may be provided on the first channel 1002 to each of the first radio communication device 114, the third radio communication device 118 and the fourth radio communication device 120. A first set of resource elements 1004 on the first channel 1002 may be provided to the first radio communication device 114. A second set of resource elements 1008 on the first channel 1002 may be provided to the fourth radio communication device 120. A third set of resource elements 1010 on the first channel 1002 may be provided to the third radio communication device 118. The first set of resource elements 1004 on the first channel 1002, the second set of resource elements 1008 on the first channel 1002, and the third set of resource elements 1010 on the first channel 1002, may also be considered as to form the available resources in a first transmitted signal.

A second channel 1012 may be provided to the second radio communication device 116 and the fifth radio communication device 122. Different resource elements may be provided on the second channel 1012 to the second radio communication device 116 and the fifth third radio communication device 122. A first set of resource elements 1014 on the second channel 1012 may be provided to the fifth radio communication device 122. A second set of resource elements 1016 on the second channel 1012 may be provided to the second radio communication device 116. The first set of resource elements 1014 on the second channel 1012 and the second set of resource elements 1016 on the second channel 1012 may also be considered as to form the available resources in a second transmitted signal.

It will be understood that although the region of resource elements assigned to each of the radio communication devices is shown as a rectangular block in the channel grid, the resource elements do not have to be arranged in this shape. Resource elements may be attributed in regions of any shape, wherein the regions do not even have to be connected. Furthermore, although the scenario is described with respect to resource elements, any other division of radio resources may be used according to various embodiments. Although only two channels are present in the scenario, it is to be understood that the number of channels is not limited to two.

In the example of allocation of 3GPP LTE Resource Elements to various Femto-Cells (with each "transmitted signal" using a distinct carrier frequency) according to FIG. 10, the assignment of resources may be non-overlapping and thus any interference on the data-part of the frame may be avoided.

For the scenario of FIG. 10, it may be assumed that enough available resources are available in order to assign distinct resources to distinct radio communication devices, for example to distinct Femto-Cells. This may enable an interference-free operation for the data-portion of the frame. It will be illustrated below how to extend this optimum scenario to the case where a certain allowed level of interference may help to maximize the overall system throughput.

This attribution of sub-sets of radio resource, for example of sub-sets of resource elements, to various radio communication devices, for example FC-BS, may be controlled by an operator. The corresponding attribution (decision making) unit, circuit or device may be located within the operator's core network. The hierarchical principle of this attribution will be further illustrated in the following.

Figure 11:
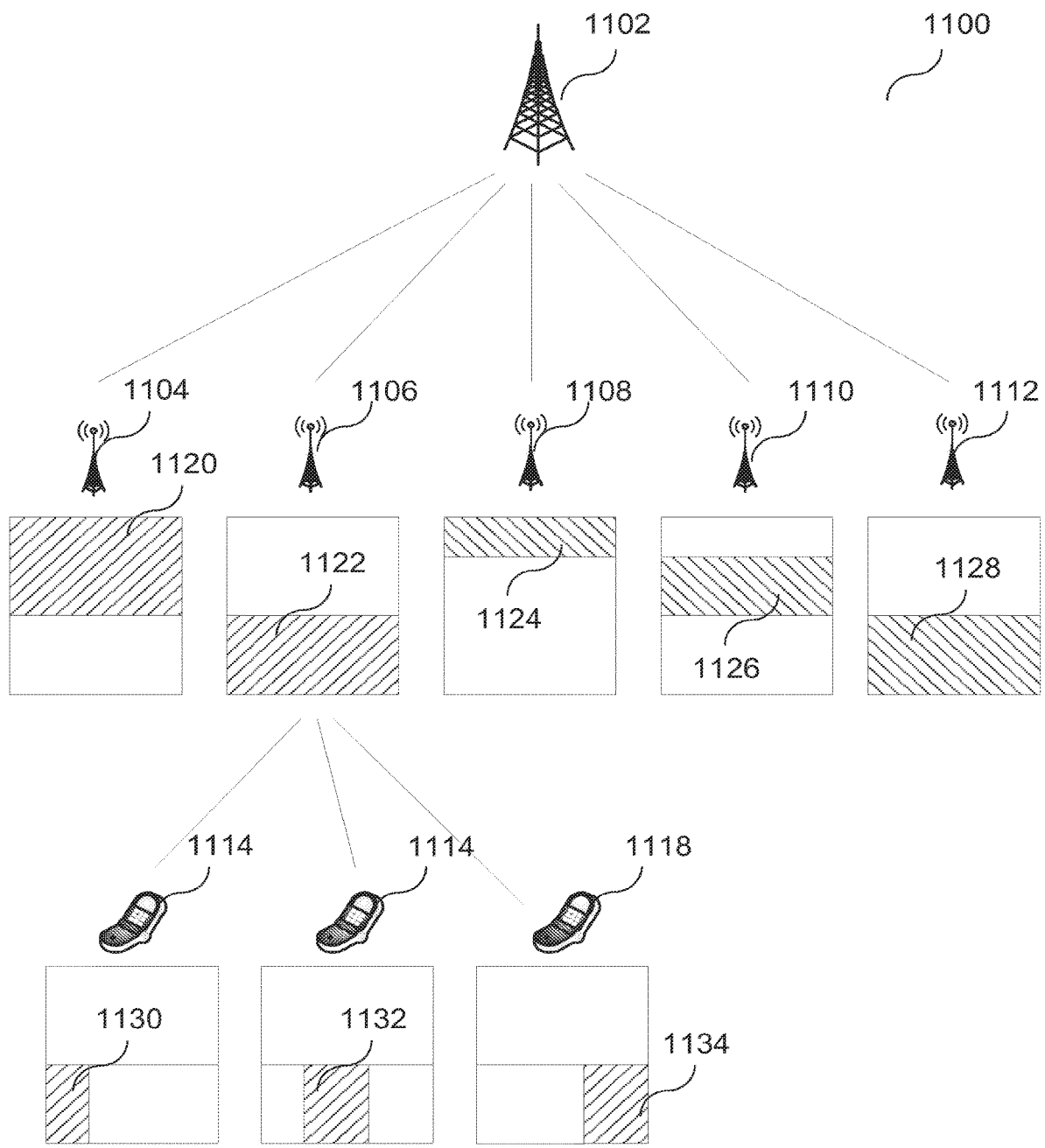
FIG. 11 shows an illustration of hierarchical radio resource management and allocation of resource elements in accordance with an embodiment.

FIG. 11 shows an illustration 1100 of hierarchical radio resource management and allocation of resource elements in accordance with an embodiment. In this embodiment, the assignment of resources may be non-overlapping and any interference on the data-part of the frame may be avoided. According to various embodiments, hierarchical attribution of interference-free resources may be provided.

In the scenario of FIG. 11, an operator, indicated by a base station symbol 1102, may assign radio resources, for example carrier frequencies and sub-sets of resource elements, to a plurality of radio communication devices, for example to various FC-BS, or for example to a first radio communication device 1104, a second radio communication device 1106, a third radio communication device 1108, a fourth radio communication device 1110, and a fifth radio communication device 1112. For example, each of the plurality of radio communication devices may be configured as a femto cell base station, indicated by a femto-cell base station symbol.

A first channel may be assigned to the first radio communication device 1104 and to the second radio communication device 1106. A second channel may be assigned to the third radio communication device 1108, to the fourth radio communication device 1110, and to the fifth radio communication device 1112. Note that the different channels are indicated by different hatchings in the resource elements 1120 to 1134 that will be explained later.

The first radio communication device 1104 may be assigned the first resource elements 1120 on the first channel, i.e. the first resource elements 1120 on the first channel may be the used resources in the first transmitted signal for the first radio communication device 1104.

The second radio communication device 1106 may be assigned the second resource elements 1122 on the first channel, i.e. the second resource elements 1122 on the first channel may be the used resources in the first transmitted signal for the second radio communication device 1106.

The third radio communication device 1108 may be assigned the first resource elements 1124 on the second channel, i.e. the first resource elements 1124 on the second channel may be the used resources in the second transmitted signal for the third radio communication device 1108.

The fourth radio communication device 1110 may be assigned the second resource elements 1126 on the second channel, i.e. the second resource elements 1126 on the second channel may be the used resources in the second transmitted signal for the fourth radio communication device 1110.

The fifth radio communication device 1112 may be assigned the third resource elements 1128 on the second channel, i.e. the third resource elements 1128 on the second channel may be the used resources in the third transmitted signal for the fifth radio communication device 1112.

After having been assigned resources, each radio communication device, for example each FC-BS, may perform an allocation of the resources within its sub-set of resource elements.

For example, the second radio communication device 1106 may receive applications for radio resources from one or more radio communication devices. For example, the second radio communication device 1106 may receive applications for radio resources from a sixth radio communication device 1114, from a seventh radio communication device 1116 and from an eighth radio communication device 1118. Each of the sixth radio communication device 1114, the seventh radio communication device 1116 and the eighth radio communication device 1118 may be configured according to a UE, indicated by the mobile telephone symbol. For example, the second radio communication device 1106 may assign radio resources 1130, which are a subset of the second radio resources 1122 on the first channel that have been assigned to the second radio communication device 1106, to the sixth radio communication device 1130. Likewise, the second radio communication device 1106 may assign radio resources 1132, which are a subset of the second radio resources 1122 on the first channel that have been assigned to the second radio communication device 1106, to the seventh radio communication device 1132. Furthermore, the second radio communication device 1106 may assign radio resources 1134, which are a subset of the second radio resources 1122 on the first channel that have been assigned to the second radio communication device 1106, to the eighth radio communication device 1134.

According to the scenario of FIG. 11, introduction of interference may be avoided in the hierarchical radio resource management. Each of the radio communication devices that are assigned radio resources from the network operator, may receive distinct radio resources, by using different channels and/or by using different resource elements. Furthermore, each of those radio communication devices, for example FC-BS, may further assign parts of the radio resources it has been assigned, to radio communication devices, for example UE, applying for radio resources.

In case that the fully orthogonal distribution of resource is insufficient in order to achieve the desired QoS (or to maximize the overall system throughput), the following approach may be taken in accordance with various embodiments: According to various embodiments, the resources within one channel may be split among various radio communication devices, for example FC-BS, while a controlled level of interference may be allowed between some selected radio communication devices. It is to be noted that the controlled level of interference may be introduced in any layer of the hierarchical radio resource management, i.e. both in the assignment of radio resources from a network operator to radio communication devices such as FC-BS, and from those radio communication devices to further radio communication devices, such as UE.

According to various embodiments, application of HRRM may be performed in the following steps:

1) A central controller may distribute carrier frequencies and sub-sets of radio resources among radio communication devices, for example FC-BS; for this purpose, assignment interleaving may be applied as will be explained in more detail below;

2) Each radio communication device may calculate an optimum allocation of the resources (that may have been assigned before to this specific radio communication devices, for example FC-BS) to further radio communication devices, for example UEs, which are attached to this specific radio communication device, for example FC-BS.

The communication may start between the further radio communication devices, for example UEs, and the radio communication devices, for example FC-BS, they are assigned to. The above described steps may allow a very dense deployment of radio communication devices, for example FC-BS, such as it may be expected for densely populated housing areas, etc.

Figure 12:
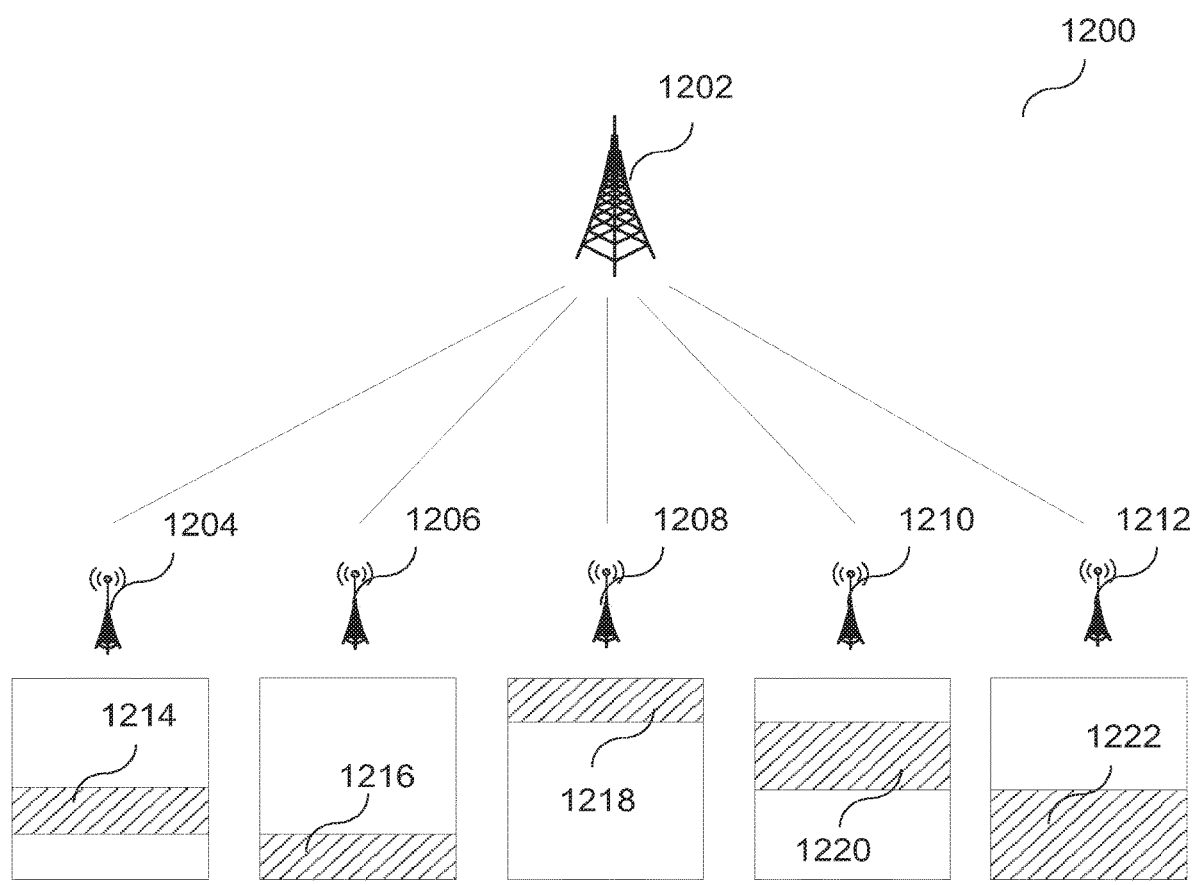
FIG. 12 shows an illustration of radio resource management tolerating the presence of interference in accordance with an embodiment.

FIG. 12 shows an illustration 1200 of radio resource management tolerating the presence of interference in accordance with an embodiment. An operator, indicated by a base station symbol 1202, may assign radio resources, for example carrier frequencies and sub-sets of resource elements, to radio communication devices, for example to various FC-BS. For example, the operator 1202 may assign radio resources to a first radio communication device 1204, to a second radio communication device 1206, to a third radio communication device 1208, to a fourth radio communication device 1210, and to a fifth radio communication device 1212. In the scenario of FIG. 12, it is assumed that all radio resources are used in the same transmitted signal, for example on the same channel.

In this scenario, it may be assumed that there are not enough available radio resources in order to assign distinct radio resources to distinct radio communication device, for example FC-BS establishing femto-cells. Depending on the actual femto-cell deployment, this may be preferable compared to the solution of FIG. 11 with respect to the overall system throughput maximization and user satisfaction.

It may not always be optimum to avoid any interference—for example from an overall system throughput perspective. Depending on the desired operational modes for the various devices (in particular, the parameters impacting the physical layer performance are of importance, such as modulation (QPSK (Quadrature phase-shift keying), QAM-16 (QAM: Quadrature amplitude modulation), QAM-64, etc.), the FEC (forward error correction) code-rate (R=1/2, 2/3, . . . ), etc.). If a certain mode requires a very high level of robustness, it may be desirable to avoid any interference. However, if a moderate or low level of robustness is chosen, some (controlled) level of interference may be not impacting the system interference and may lead to a higher overall throughput.

In various embodiments, robustness may be understood in terms of a high signal-to-noise-plus-interference ratio (SINR), i.e. a mode that requires a pre-defined level of robustness may require that the SINR is higher than a pre-defined threshold.

In various embodiments, each of the plurality of radio communication devices may be configured as a femto cell base station, indicated by a femto-cell base station symbol.

For example, the first radio communication device 1204, the second radio communication device 1206 and the fifth radio communication device 1212 allow a given level of interference. This may result in that very high throughput modes may be not available for these radio communication devices, but may lead to efficient resource usage for distant radio communication devices, for example FC-BS establishing femto cells, at low to mid range efficient modes. As a result, according to various embodiments, the first radio communication device 1204, the second radio communication device 1206 and the fifth radio communication device 1212 may be assigned radio resources that may cause interference. In various embodiments, the radio resources may be assigned so that even if interference is allowed, interference may be minimized by assigning partially overlapping radio resources (that is radio resources which may probably cause interference) to distant radio communication devices. In the example shown in FIG. 12, the first radio communication device 1204 is assigned the first radio resources 1214, the second radio communication device 1206 is assigned the second radio resources 1214, and the fifth radio communication device 1212 is assigned the radio resources 1222. Thus, as shown in FIG. 12, the first radio communication device 1204 may possible experience interference with the fifth radio communication device 1212. However, because the first radio communication device 1204 and the fifth radio communication device 1222 are located far from each other, interference may be low. Similarly, only low interference may be cause between the second radio communication device 1206 and the fifth radio communication device 1212. The first radio communication device 1204, and the second radio communication device 1206, which may be located close to each other, may not experience interference from each other, because they may use distinct radio resources.

For example, the third radio communication device 1208 and the fourth radio communication device 1210 may be configured to not allow any interference. This may allow high-troughput modes.

Therefore, according to various embodiments, the third radio communication device 1208 may be assigned third radio resources 1218 exclusively. Only the third radio communication device 1208 may use the third radio resources 1218. Therefore, the third radio communication device 1208 may experience no interference. Similarly, the fourth radio communication device 1210 may be assigned fourth radio resources 1220 exclusively. Only the fourth radio communication device 1210 may use the fourth radio resources 1220. Therefore, the fourth radio communication device 1220 will experience no interference.

In the scenario of FIG. 12, it may be desirable that the interference generated by the first radio communication device 1204, the second radio communication device 1206 and the fifth radio communication device 1212 is as low as possible. According to various embodiments, this may be achieved by assigning the corresponding radio resources to geographically distant radio communication devices. The principle will be illustrated in the sequel.

Figure 13:
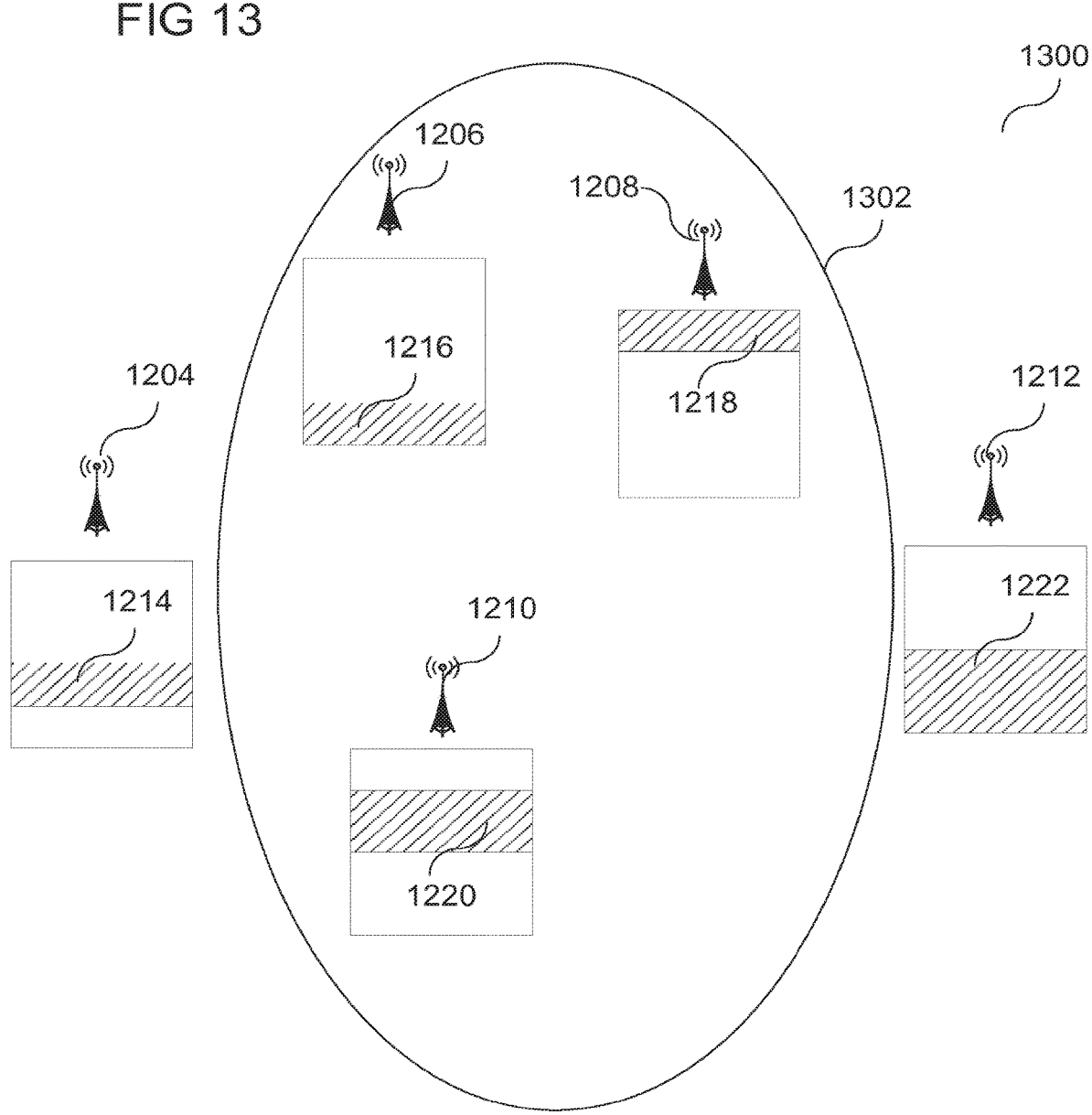
FIG. 13 shows an illustration of positioning of interference radio communication devices in the framework of radio resource management in accordance with an embodiment.

FIG. 13 shows an illustration 1300 of positioning of interference radio communication devices, i.e. radio communication devices that allow interference, in the framework of radio resource management in accordance with an embodiment. The radio communication devices and the radio resources are the same as in FIG. 12, and a repeated explanation thereof is omitted.

According to various embodiments, if the amount of available radio resources requires that the occupied radio resources of two or more radio communication devices are overlapping, the most distant radio communication devices may use overlapping resources and thus the interference may be minimized. This is illustrated in FIG. 13 by the ellipse 1302. The second radio communication device 1206, the third radio communication device 1208 and the fourth radio communication device may use distinctive radio resources, and thus do not interfere with each other. The possibly interfering radio communication devices, the first radio communication device 1214 and the fifth radio communication device 1222 may have been chosen to be the most distant radio communication devices.

Figure 14:
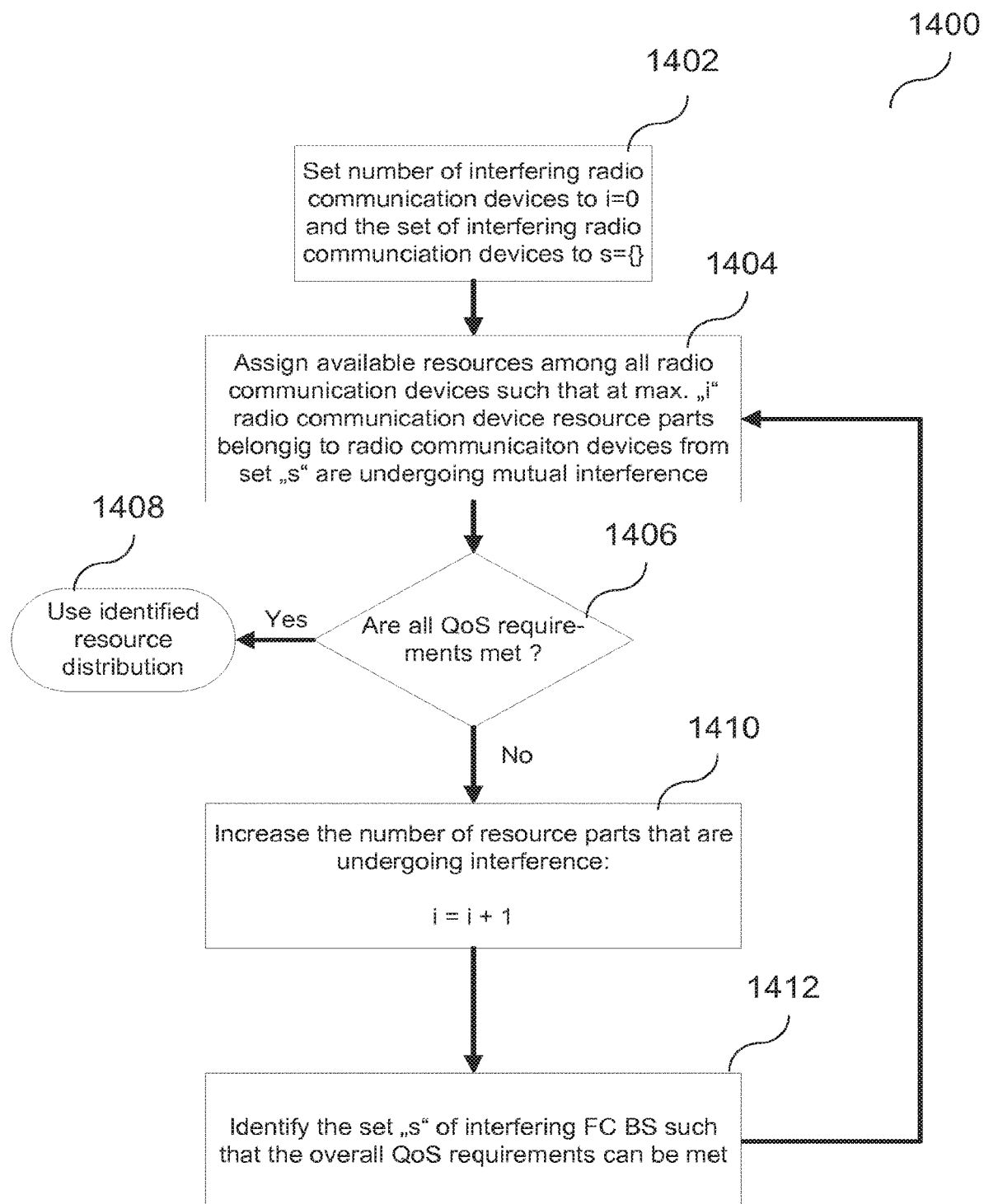
FIG. 14 shows a flow diagram illustrating the process of selecting an interfering radio communication device in accordance with an embodiment.

FIG. 14 shows a flow diagram 1400 illustrating the process of selecting an interfering radio communication device in accordance with an embodiment, in case that the total amount of radio resources is not sufficient for ensuring interference-free communication; in other words: the flow diagram 1400 shows the flow for the identification process for radio communication devices that may undergo interference.

In 1402, the number of interfering radio communication devices may be set to i=0 and the set of interfering radio communication devices may be set to s={ }, being the empty set.

In 1404, the available resources may be assigned among all radio communication devices such that at maximum "i" radio communication device resource parts belonging to radio communication devices from the set "s" are undergoing mutual interference.

In 1406, it may be determined whether all quality of service (QoS) requirements are met.

In case it is determined that all quality of service requirements are met (Yes in 2006), the identified resource distribution may be used (1408).

In case it is determined that not all quality of service requirements are met (No in 1406), then in 1410 the number of resource parts that may undergoing interference may be increased, i.e. i may be increased by one, i.e. i=i+1. The resources attributed to two or more radio communication devices that are mutually interfering may be considered as the resource parts that are undergoing interference.

In 1412, the set "s" of interfering radio communication devices may be identified such that the overall QoS requirements may be met. This set may need to be derived from scratch following each iterative step of this process; it may be not able to build on a simple extension of the set from the previous step.

Figure 15:
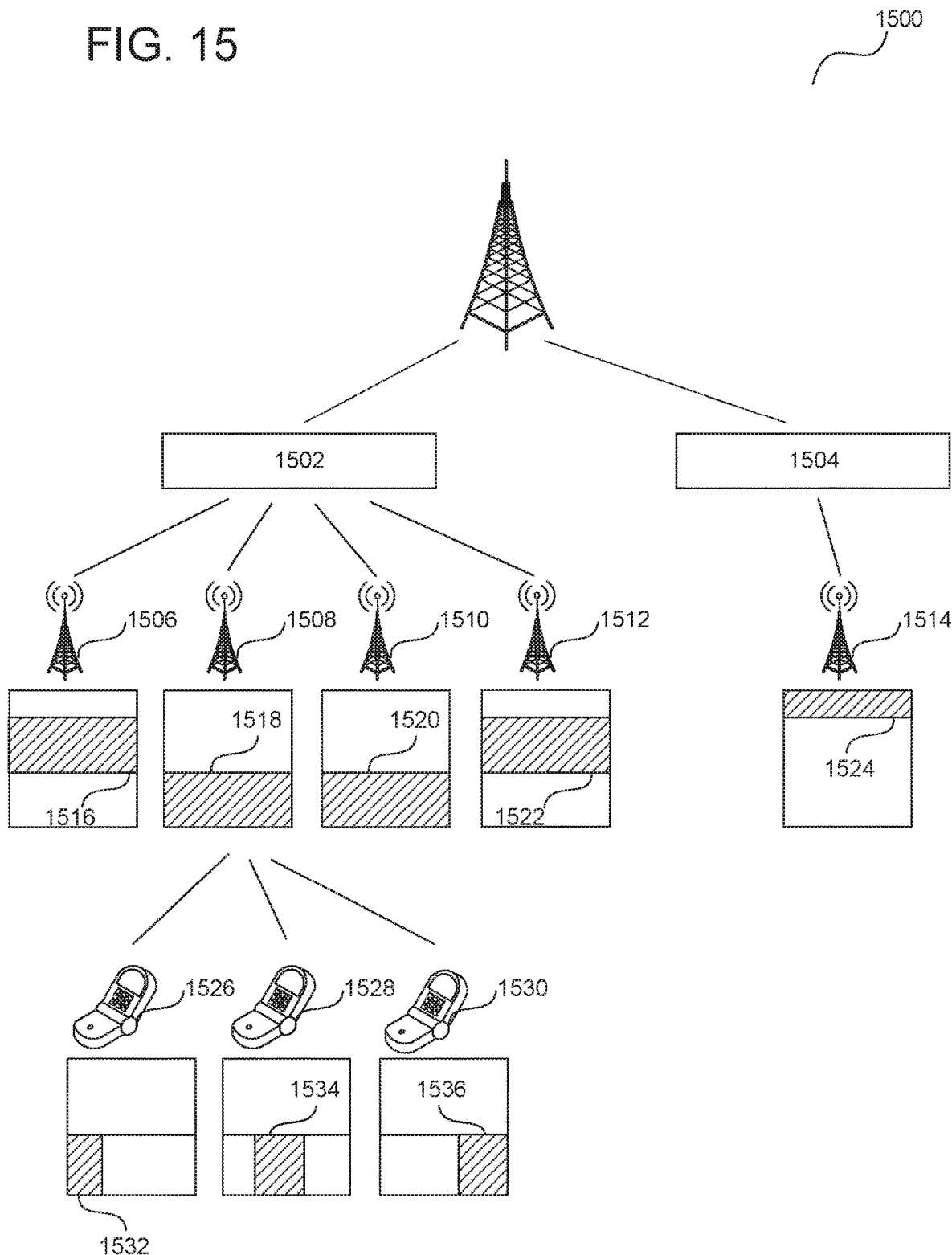
FIG. 15 shows an illustration of radio resource management tolerating the presence of interference in accordance with an embodiment.

FIG. 15 shows an illustration 1500 of radio resource management tolerating the presence of interference in accordance with an embodiment. According to various embodiments, hierarchical attribution of resources tolerating a controlled level of interference is provided. Similar to the illustration 1100 of FIG. 11, a plurality of radio communication devices 1506, 1508, 1510, 1512, 1514 may be assigned radio resources 1516, 1518, 1520, 1522, 1524, and each radio communication device may further assign the radio resources assigned to it to further radio communication devices (for example, the second radio communication device 1508 may further assign parts of the radio resources 1518 assigned to it to a sixth radio communication device 1526 (radio resources 1532), to a seventh radio communication device 1528 (radio resources 1534) and to an eighth radio communication device 1530 (radio resources 1530). Therefore, detailed description of the radio communication devices is omitted. According to various embodiments, the following modifications compared to the scenario according to FIG. 11 are provided in order to include the controlled admission of interference for some radio communication devices. An additional device or circuit implementing an additional layer that may deal with the interference may be provided. The additional device or circuit implementing the additional layer may identify and group the radio communication devices for which a controlled level of interference is acceptable (indicated by block 1502; in this case for example the first radio communication device 1506, the second radio communication device 1508, the third radio communication device 1510, and the fourth radio communication device 1512) and may identify and group the radio communication devices for which full interference avoidance is desired (indicated by block 1504; in this case for example the fifth radio communication device 1514). According to various embodiments, a controlled level of interference may be tolerated. According to various embodiments, as illustrated in FIG. 15, also radio communication devices that tolerate interference may further assign the assigned radio resources to further radio communication devices, like for example the second radio communication device 1508.

Figure 16:
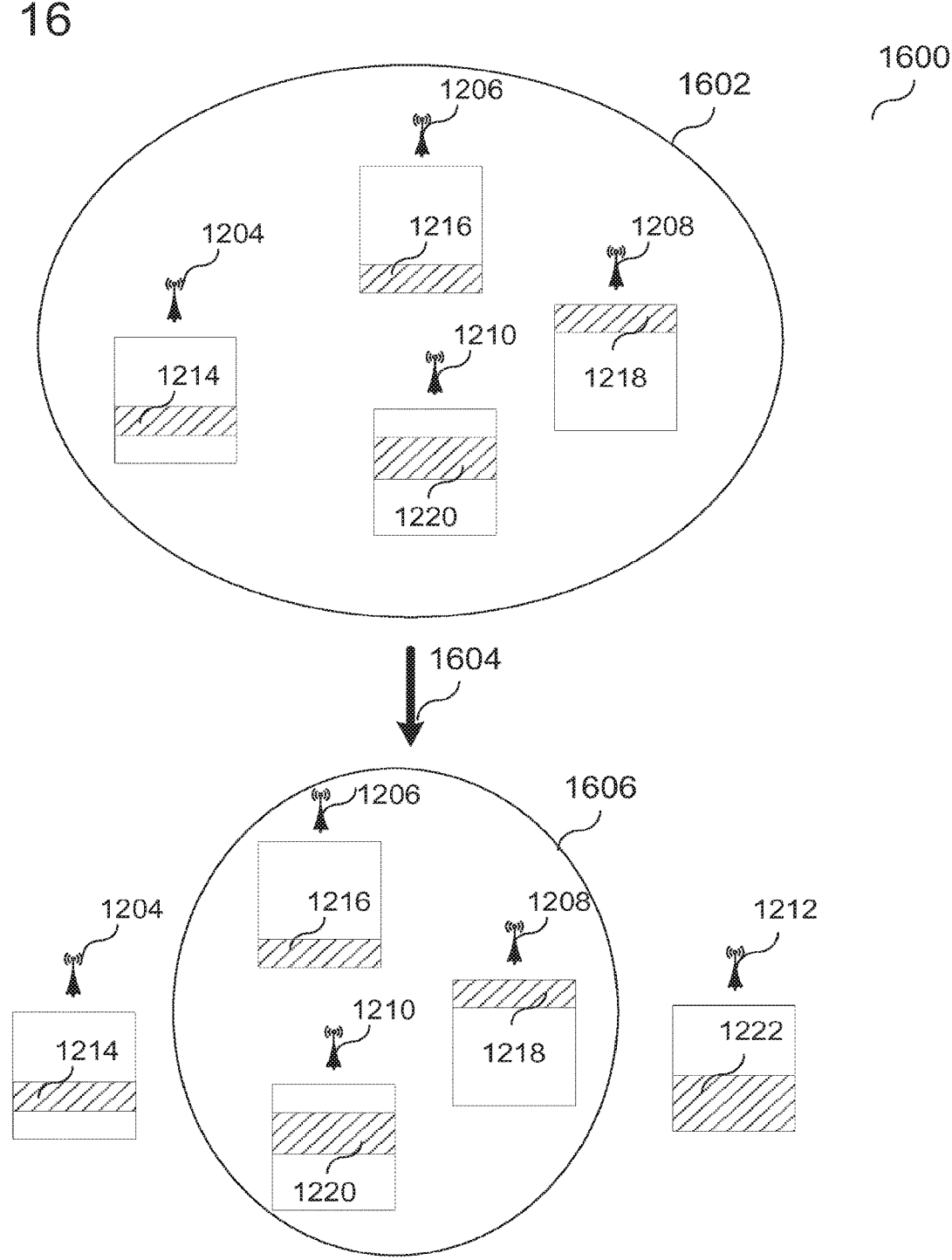
FIG. 16 shows an illustration of adding a new radio communication device with tolerating a controlled level of interference in accordance with an embodiment.

FIG. 16 shows an illustration 1600 of adding a new radio communication device with tolerating a controlled level of interference in accordance with an embodiment. The radio communication devices and the assigned radio resources are the same as those in FIG. 12. Therefore, description thereof is omitted.

In the upper part of FIG. 16, a scenario is shown, where a plurality of radio communication devices (the first to fourth radio communication device of FIG. 12) are active. Communication may be performed without any interference, indicated by ellipse 1602. Then, indicated by the arrow 1604, in the lower part of FIG. 16, the fifth radio communication device 1212 is switched on or moves into the considered region. Then, according to various embodiments, assuming that the amount of available radio resources requires that the occupied radio resources of two radio communication devices are overlapping, the interference may be minimized and the most distant radio communication devices may use overlapping resources. Communication without interference may occur between the second radio communication device 1206, the third radio communication device 1208 and the fourth radio communication device 1210, as indicated by ellipse 1606.

According to various embodiments, methods and devices are provided for activation of a new radio communication device and allocation of corresponding radio resources. In this case, it may be assumed that most or all of the available radio resources are attributed to radio communication devices in a given area. It may be assumed that suddenly, a new radio communication device may enter this scenario and may request also a set of radio resources.

In this case, according to various embodiments, two approaches are possible:

1) Complete redistribution of all radio resources among all radio communication devices as indicated above (which may be considered optimum from an overall resource usage efficiency perspective, but may be not desired from a practical perspective since all elements in the network may have to be reconfigured); or 2) Keep the current configuration and identify radio communication devices for which a set of interfering resource blocks originating from the novel radio communication device is tolerable, as illustrated with reference to FIG. 16.

The corresponding decision process will be illustrated in the sequel.

Figure 17:
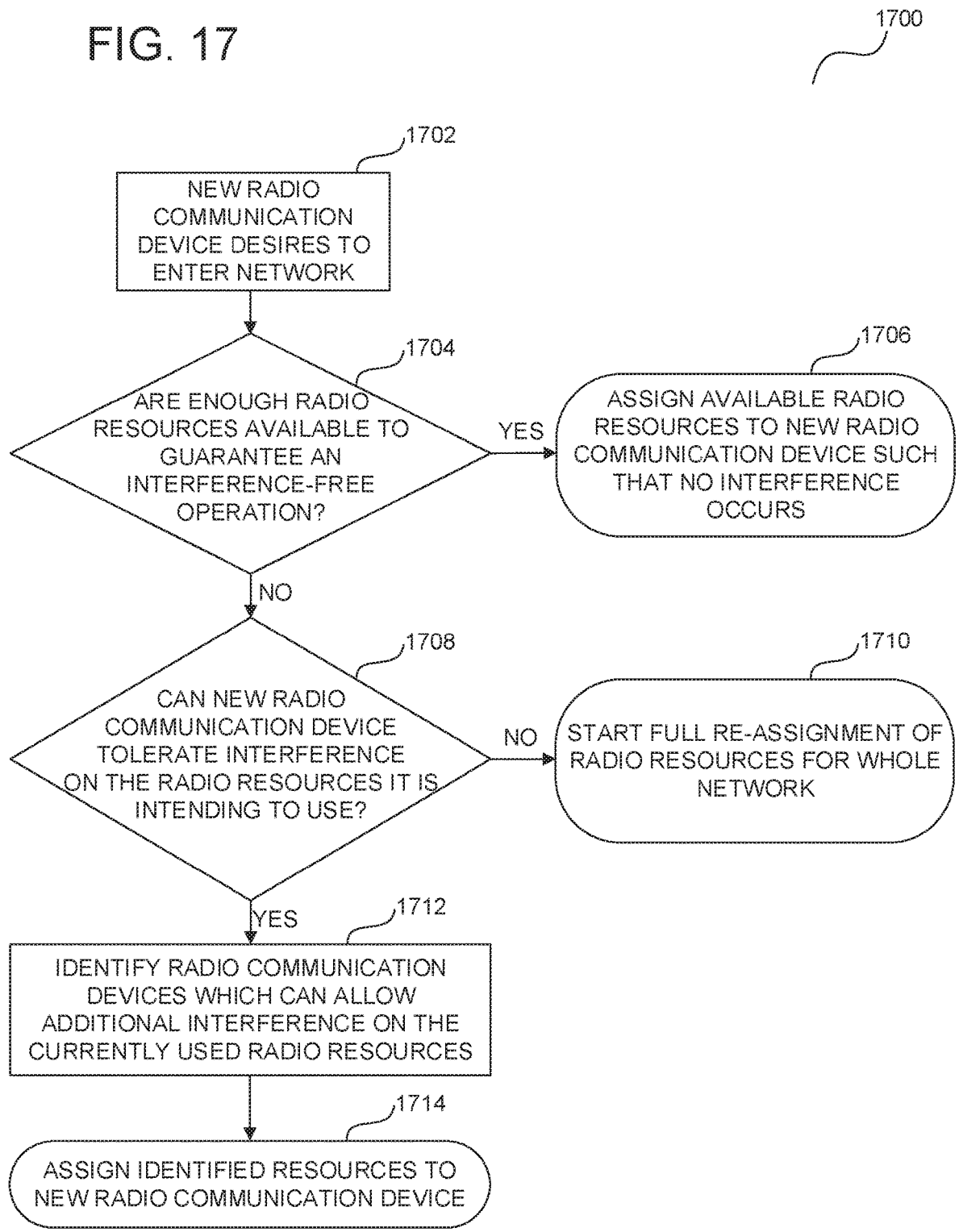
FIG. 17 shows a flow diagram illustrating an identification process for newly entering radio communication devices in accordance with an embodiment.

FIG. 17 shows a flow diagram 1700 illustrating an identification process for newly entering radio communication devices in accordance with an embodiment.

In 1702, a new radio communication device may desire to enter the network.

1 In 1704, it may be determined whether there are enough radio resources available to guarantee an interference-free operation.

If it is determined that there are enough radio resources available to guarantee an interference-free operation (Yes in 1704), available radio resources may be assigned to new radio communication device such that no interference occurs (1706).

If it is determined that there are not enough radio resources available to guarantee an interference-free operation (No in 1704), it may be determined in 1708 whether the new radio communication device can tolerate interference on the radio resources it is intending to use.

In case it is determined that the new radio communication device can not tolerate interference on the radio resources it is intending to use (No in 1708), a full re-assignment of radio resources for whole network may be started (1710).

In case it is determined that the new radio communication device can tolerate interference on the radio resources it is intending to use (Yes in 1708), radio communication devices which can allow additional interference on the currently used radio resources may be identified in 1712.

In 1714, identified resources may be assigned to the new radio communication device.

Figure 18:
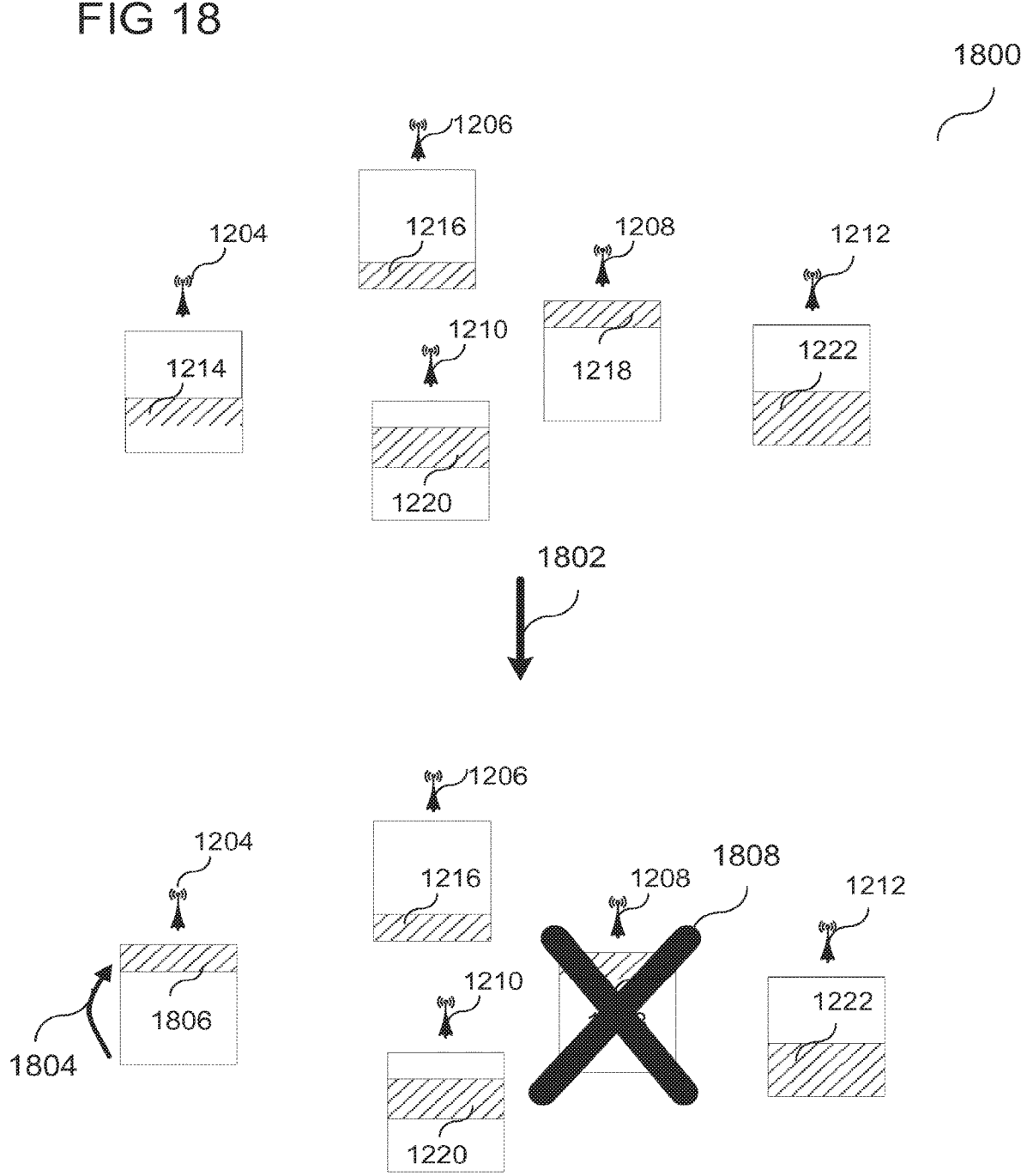
FIG. 18 shows an illustration of de-activation of a radio communication device combined with the reduction of interference in accordance with an embodiment.

FIG. 18 shows an illustration 1800 of de-activation of a radio communication device combined with the reduction of interference in accordance with an embodiment. The radio communication devices and the assigned radio resources are the same as those in FIG. 12. Therefore, description thereof is omitted.

In the upper part of FIG. 18, the first to fifth radio communication device of FIG. 12 are communicating, and are partially experiencing interference.

Assuming that the amount of available radio resources requires that the occupied radio resources of two or more radio communication devices are overlapping, the interference may be minimized and thus the most distant radio communication devices may use overlapping resources.

Then, for example, the fourth radio communication device 1208 intends to be switched off. After the fourth radio communication device 1208 has been switched off, as indicated by arrow 1804 and cross 1808, according to an embodiment, the radio resources of the first radio communication device 1204 may be changed, as indicated by arrow 1804 to new radio resources 1806. According to an embodiment, this may lead to a communication without any interference, i.e. no interference may occur anymore.

According to various embodiments, methods and devices are provided for de-activation of a radio communication device. According to various embodiments, in case that a radio communication device is switched off, the following steps may be taken with respect to the radio resources that were occupied by the concerned radio communication device:

1) Simplest case: All other radio communication devices may continue operating as before, no redistribution of unused resources may be performed. This approach is inherently simple, but this approach may not be optimum from an overall resource usage efficiency perspective.

2) Avoidance of interference: A selective radio resource re-distribution may be performed in order to minimize the interference which some radio communication devices are undergoing. The principle is illustrated in FIG. 18.

The corresponding process according to various embodiments is detailed in the following.

Figure 19:
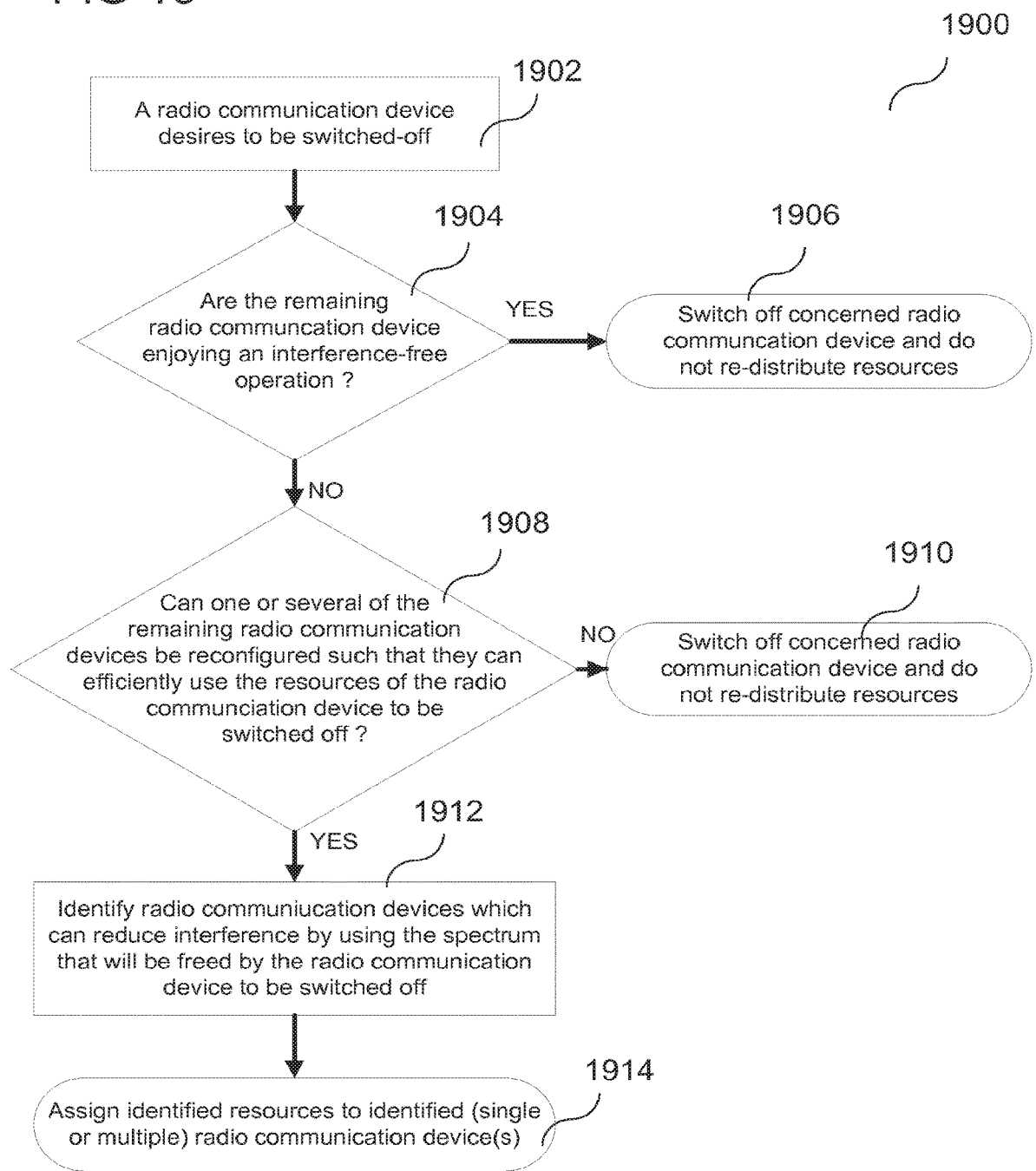
FIG. 19 shows a flow diagram illustrating an identification process for switching-off a radio communication device in accordance with an embodiment.

FIG. 19 shows a flow diagram 1900 illustrating an identification process for switching-off a radio communication device in accordance with an embodiment.

In 1902, a radio communication device may desire to be switched-off.

In 1904, it may be determined whether the remaining radio communication devices are enjoying an interference-free operation.

In case it is determined that the remaining radio communication devices are enjoying an interference-free operation (Yes in 1904), the concerned radio communication device may be switched off without performing a re-distribution of radio resource (1906).

In case it is determined that the remaining radio communication devices are not enjoying an interference-free operation (No in 1904), it may be determined in 1908 whether one or several of the remaining radio communication devices may be reconfigured such that they can efficiently use the resources of the radio communication device to be switched off.

In case it is determined that none of the remaining radio communication devices may be reconfigured such that they can efficiently use the resources of the radio communication device to be switched off (No in 1908), the concerned radio communication device may be switched off without performing a re-distribution of radio resource (1910).

In case it is determined that one or several of the remaining radio communication devices may be reconfigured such that they can efficiently use the resources of the radio communication device to be switched off (Yes in 1908), the radio communication devices which can reduce interference by using the spectrum that will be freed by the radio communication device to be switched off may be identified (1912).

In 1914, identified resources may be assigned to the identified radio communication device or to the identified radio communication devices.

Figure 20:
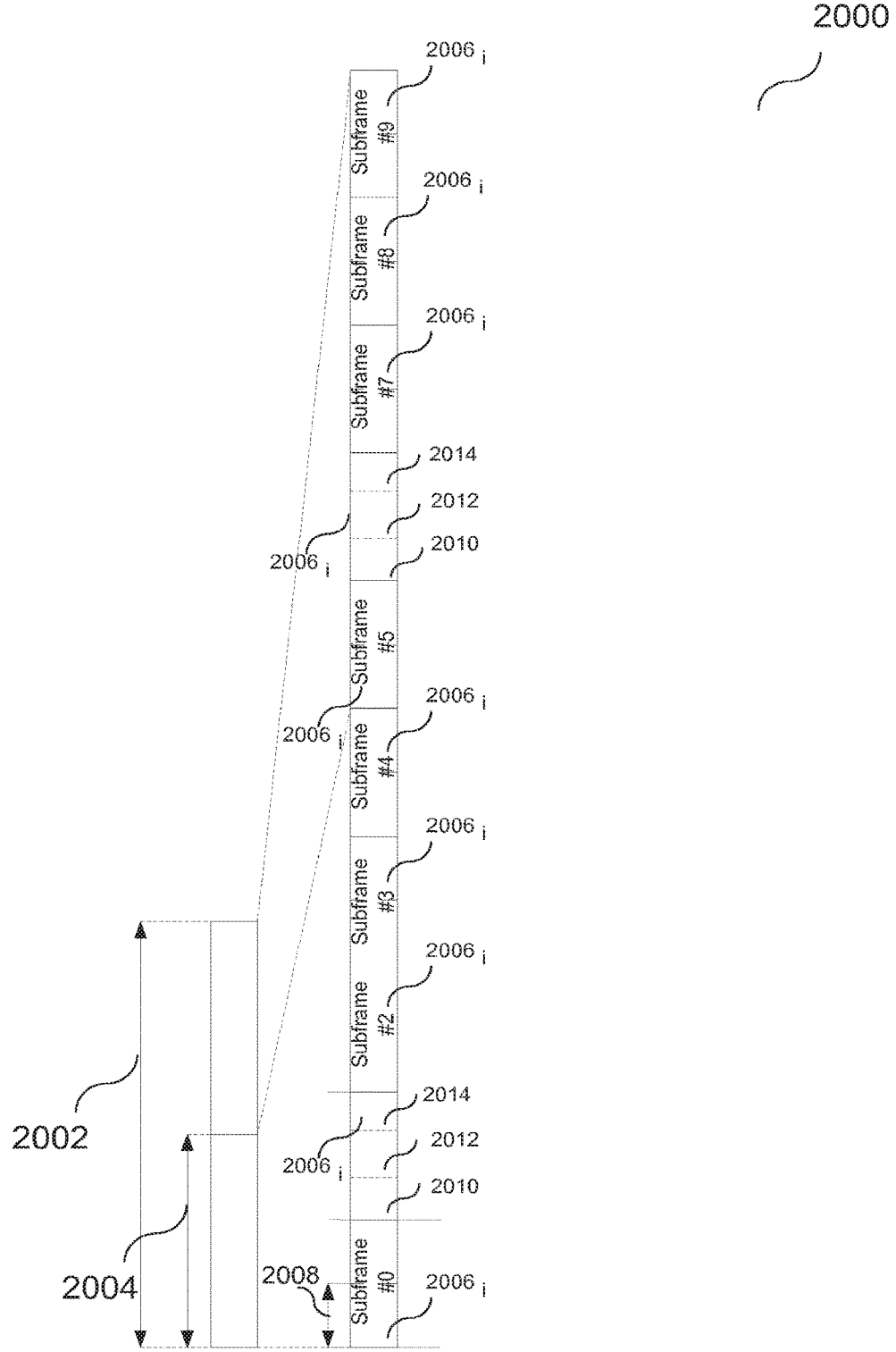
FIG. 20 shows a frame structure type 2 (TDD (Time Division Duplex) mode) for 3GPP LTE.

FIG. 20 shows a frame structure 2000, in particular a frame structure type 2 (TDD (Time Division Duplex) mode) for 3GPP LTE. While the Resource Elements can be shared among multiple radio communication devices, it is not possible to do the same for the remaining parts of the frame, such as synchronization sequence fields, etc. These parts are illustrated by the following. The structure 2000 shows one radio frame 2002, for example of the length $T_f$=307200, $T_s$=10 ms, including two half frames 2004, for example of the length 153600$T_s$=5 ms. The frame may be split into a plurality of subframes 2006$_i$, for example of length 30720$T_s$. A slot 2008 in a subframe may be of the length One slot, $T_{slot}$=15360 $T_s$. Specific subframes may be reserved for transmission of special fields 2010, 2012, and 2014 as will be explained in more detail below, for example synchronization sequence fields.

For example, for frame structure type 2, the primary synchronization signal may be transmitted in the first symbol of the DwPTS (Downlink Pilot Timeslot) field 2010. The corresponding frequency band may be not shared among multiple radio communication devices, for example FC-BS, in a completely orthogonal way if the upper frame structure needs to be maintained.

However, there may be a fundamental difference between these special fields (in particular, DwPTS 2010, GP (Guard Period) 2012 and UpPTS (Uplink Pilot Timeslot) 2014) in comparison to other data-carrying field (consisting of the "Resource Elements" structure): The data-carrying field may desire a high SINR in order to enable high-throughput modes; the special fields (in particular, DwPTS, GS and UpPTS, pilots, etc.), however, may be designed to operate at poor SINR levels sufficiently well. I.e. it may be sufficient to achieve a distribution of resources that guarantees high SINR levels for the data-carrying fields and average-SINR levels for the special fields.

According to various embodiments, assignment interleaving of distinct carriers and distinct radio resource sub-sets, for example resource element sub-sets, to the various radio communication devices, for example FC-BS, may be provided as illustrated in the following.

Figure 21:
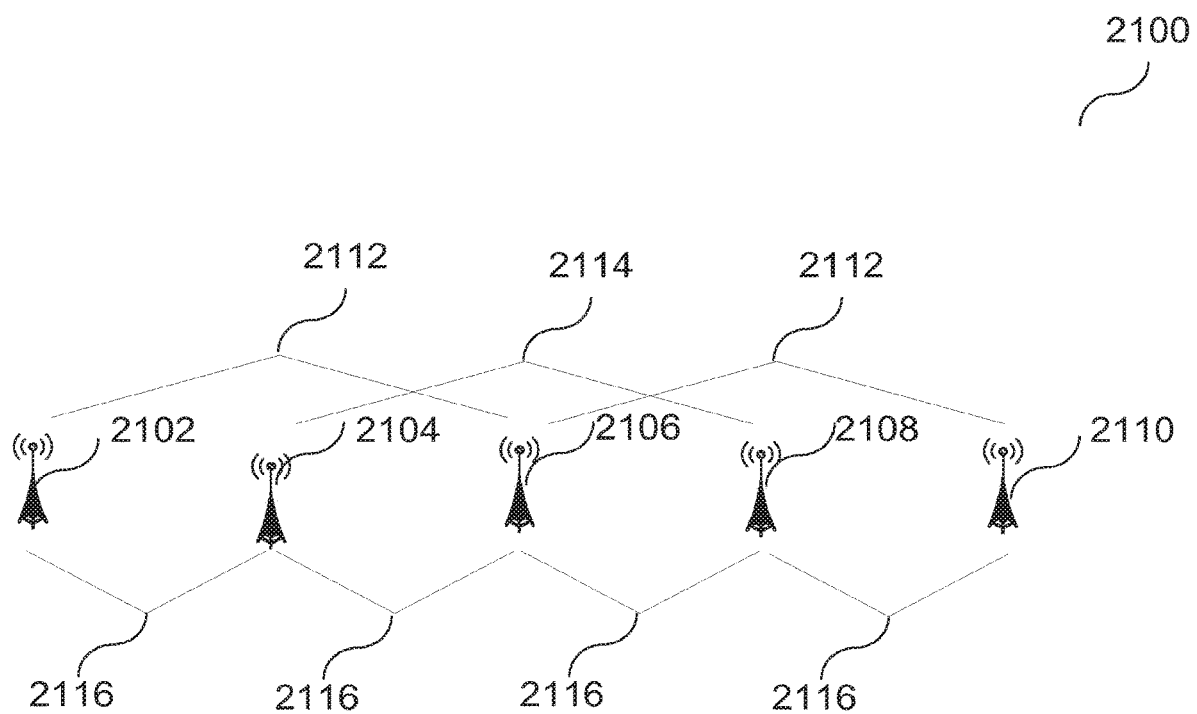
FIG. 21 shows a radio communication system providing assignment interleaving of distinct carriers and distinct radio resources in accordance with an embodiment.

FIG. 21 shows a radio communication system providing assignment interleaving of distinct carriers and distinct radio resources in accordance with an embodiment. A first radio communication device 2102 may be assigned a first carrier frequency. A second radio communication device 2104 may be assigned a second carrier frequency. A third radio communication device 2106 may be assigned the first carrier frequency. A fourth radio communication device 2108 may be assigned the second carrier frequency. A fifth radio communication device 2110 may be assigned the first carrier frequency. The first carrier frequency may be different from the second carrier frequency.

Furthermore, radio resources of the first carrier frequency may be assigned in a non overlapping way like described above. Thus, no interference among radio resources, for example resource elements, may be present due to orthogonal assignment, between the first radio communication device 2102, the third radio communication device 2106 and the fifth radio communication device 2110 using the first carrier frequency like indicated by reference numerals 2112. Only low-level interference on special fields may occur for these radio communication devices, since frequencies may be overlapping, but transmitters are distant.

Likewise, radio resources of the second carrier frequency may be assigned in a non overlapping way like described above. Thus, no interference among radio resources, for example resource elements, may be present due to orthogonal assignment, between the second radio communication device 2104 and the fourth radio communication device 2106 using the second carrier frequency like indicated by reference numeral 2114. Only low-level interference on special fields may occur for these radio communication devices, since frequencies may be overlapping, but transmitters are distant.

Furthermore, no interference may be present between two neighboring radio communication devices (for example between the first radio communication device 2102 and the second radio communication device 2104; and between the second radio communication device 2104 and the third radio communication device 2106; and between the third radio communication device 2106 and the fourth radio communication device 2108; and between the fourth radio communication device 2108 and the fifth radio communication device 2110) and due to distinct carrier frequencies, like indicated by reference numerals 2116.

It is to be noted that the example scenario 2100 has been shown for five radio communication devices, but the number of radio communication devices to which assignment interleaving may be applied is not limited to five but may be any natural number. Furthermore, although two carrier frequencies have been assumed to be used in the example scenario 2100, the number of distinct carrier frequencies is not limited to two, but may be any natural number. Furthermore, although the example scenario 2100 has been shown for a one-dimensional neighborhood, i.e. the radio communication devices have been shown to be aligned in a line, assignment interleaving may also be applied to radio communication devices provided in a two-dimensional way.

It is to be noted that the scenario 1000 in FIG. 10 uses assignment interleaving.

Figure 22:
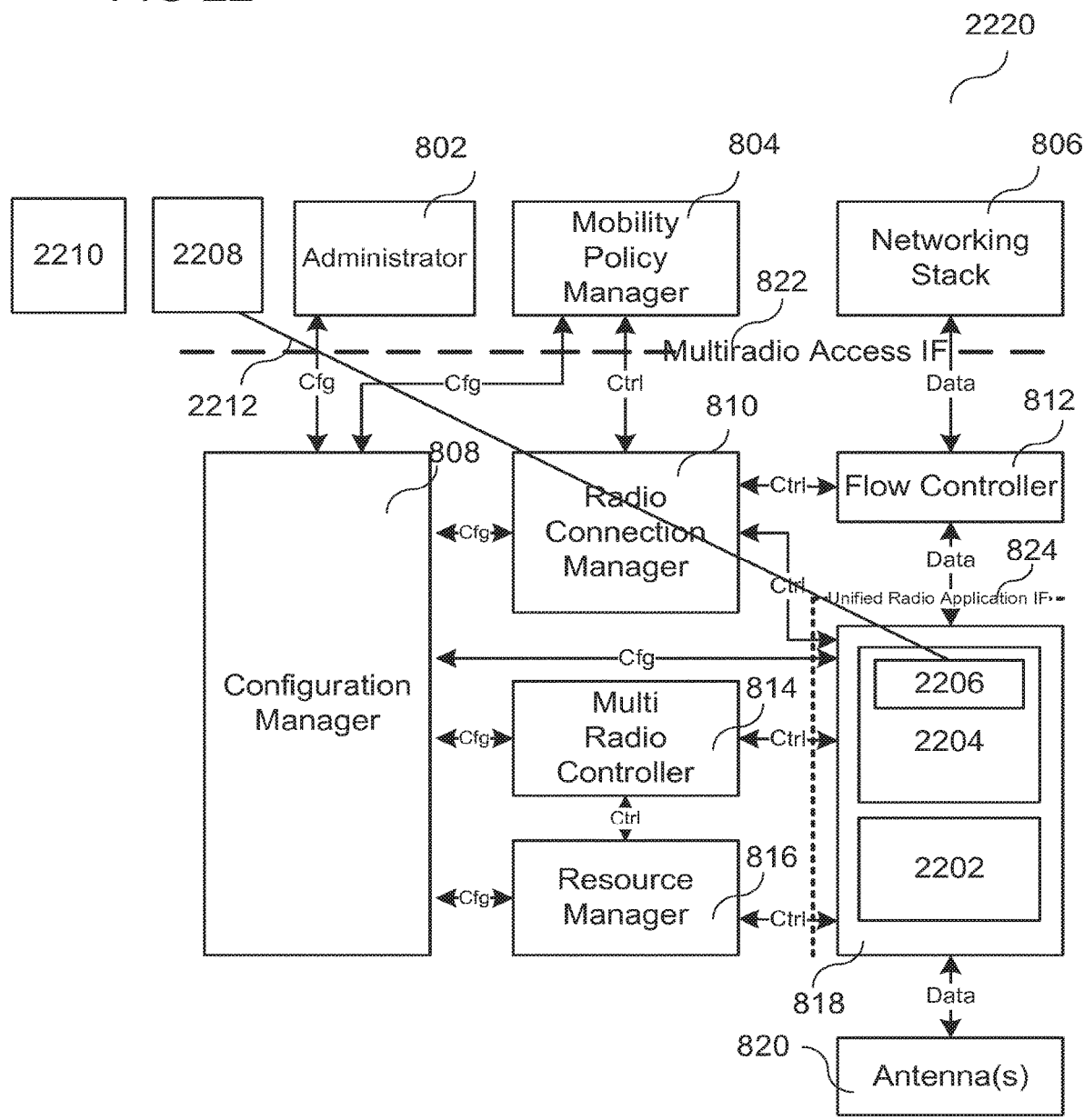
FIG. 22 shows an architecture of a reconfigurable radio system in accordance with an embodiment.

FIG. 22 shows an architecture of a reconfigurable radio system 2200 in accordance with an embodiment, for example, the extension of an ETSI RRS SDR Architecture in order to enable HRRM. Some parts of the system 2200 are identical to parts of the system 800 of FIG. 8 and duplicate description of those parts is omitted. The system 2200 additionally includes a protocols section 2204 and an engines section 2202.

The usage of HRRM may be added into the UE architecture introduced by ETSI RRS. According to various embodiments, the functionalities may be complemented by the following:

1) Resource Allocation management 2208 (which may be not handled in the UE, but by the BS) on the application side;

2) Resource Allocation management 2206 on the SDR processor side, which may be included onto an application processor implemented within the SDR device for the actual derivation of the assignment of available Resource Elements to UEs attached to the FC-BS;

3) Connection to FC Gateway 2210 on the application side.

In other words, a HRRM device may be integrated into a dual mode FC-BS/UE device, and three extensions of the SDR UE architecture are provided in accordance with an embodiment:

1) A novel resource manager may be added on the application level with the objective to manage the sub-set of Resource Elements that is assigned to the specific FC-BS;

2) A novel resource manager may be included onto the application processor within the SDR device. The resource management calculator 2206 may perform the derivation of the assignment of Resource Elements to UEs attached to the FC-BS, taking into account the overall available Resource Elements that were attributed to this FC-BS;

3) A novel resource manager may be included onto the application processor within the SDR device. This novel resource manager may perform the derivation of the assignment of Resource Elements to UEs attached to the FC-BS, taking into account the overall available Resource Elements that were attributed to this FC-BS, The resource management 2208 and the RRM application processor 2206, for example an ARM processor, may be connected, as indicated by connection 2212.

In the ETSI RRS architecture representation, it may be desired to highlight which functionalities are provided by the application-centric part (i.e. on the uppermost level, currently including the blocks Administration 802, Mobility Policy Manager 804 and Networking Stack 806).

Figure 23:
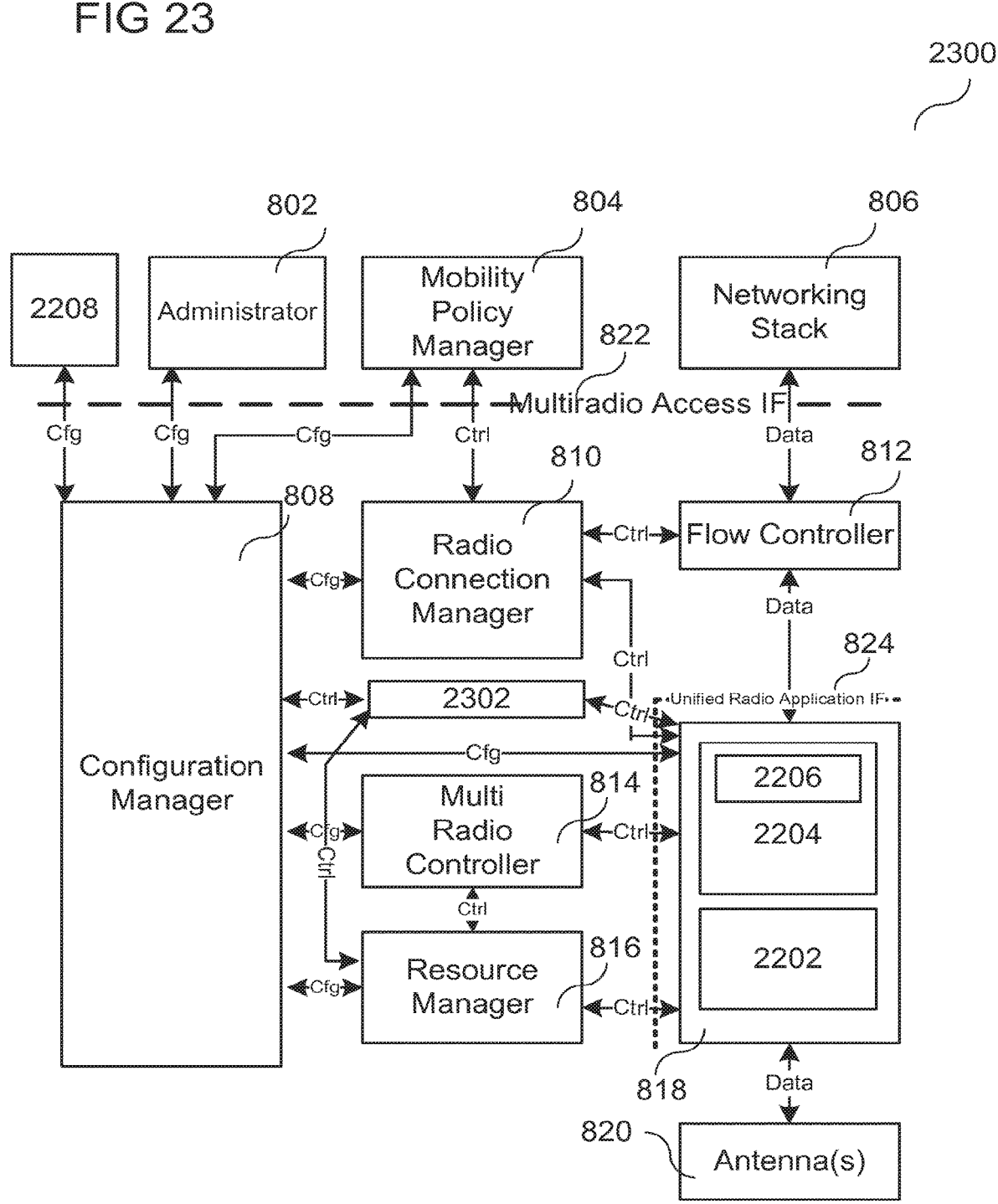
FIG. 23 shows an architecture of a reconfigurable radio system in accordance with an embodiment.

FIG. 23 shows an architecture 2300 of a reconfigurable radio system in accordance with an embodiment. In particular, the architecture shows the inclusion of an extended resources activator 2302 into the ETSI RRS Architecture.

Since part of the resources in the SDR processor may only be used if the device operates as a FC-BS (and not if it operates as a standard UE), a control module (extended resources activator 2302) may be inserted which activates the additional FC-BS resources on the SDR processor if it is desired.

Some parts of the system 2300 are identical to parts of the system 2200 of FIG. 22 and duplicate description of those parts is omitted. System 2300 additionally includes the extended resources activator 2302, which may control the configuration manager 808, the unified radio applications 818 and the resource manager 816. The unified radio applications may include one or more application processors and a SDR processor.

In various embodiments, it may not be distinguished between control information and configuration information in FIG. 8, FIG. 22 and FIG. 23, i.e. anywhere where control information is indicated to be interchanged, control information or configuration information may be interchanged, and likewise, anywhere where configuration information is indicated to be interchanged, control information or configuration information may be interchanged.

The extended resources activator 2302 may control activation of resources that may be used to provide the functionality of a FC-BS in addition to a UE. This may allow implementation of a device that may operate as a Femto-Cell BS or as a standard UE. Such a device may be in particular important in the following context:

1) Femto-Cell BS may be mobile: In this case, the Femto-Cell BS may be assumed to be transported by a user from one location to another, potentially to a foreign country. Corresponding requirements may have been provided as inputs from the national regulators. In such a context, the FC BS may desire to acquire knowledge about the operational parameters which may be applied, once the FC BS is switched on. In order to acquire these parameters, it may be expected that the FC BS has to operate as a standard UE, to maintain a connection to a neighboring Macro-BS and to recover the corresponding information while operating as a standard UE. Consequently, a device may be provided which is able to operate as FC BS as well as in a standard UE mode.

2) User device may either operate as UE or has high-speed (cabled, etc.) Internet access and may serve as BS for others: A scenario may be a meeting or similar. One user may be assumed to have a high-speed (cabled, etc.) Internet access while all others may be assumed to operate via a wireless link. In such a case, one user may decide to operate his device as a FC BS serving all others who are configured to operate as standard UEs. Consequently, a device may be provided which is able to operate as FC BS as well as in a standard UE mode.

Based on this framework, it may be possible to use the architecture of a reconfigurable UE and to add additional functionalities on top of it, in order to enable the user to switch between UE and FC BS operational modes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A User Equipment (UE) device configured to operate in a radio resource management system, the UE device comprising:
    a receiver to receive an authorization signal sent by a small cell base station;
    a decoder to decode the received authorization signal sent by the small cell base station, wherein the authorization signal includes a spectrum assignment and an output power limit for operation of the UE device, and wherein the spectrum assignment and output power limit for operation of the UE device are based on an interference metric reported by the UE device to the small cell base station; and
    a processor configured to cause the UE device to operate in a radio network using the assigned spectrum and output power limit.

2. The UE device of claim 1, wherein the UE device is further configured to operate using a time division duplex (TDD) configuration that is based on a coexistence group in which the small cell base station is enrolled.

3. The UE device of claim 2, wherein the UE is further configured to operate in an interference coordination group that is part of the coexistence group.

4. The UE device of claim 3, wherein the interference coordination group is part of a closed subscriber group.

5. The UE device of claim 3, wherein the UE stores an identifier for the closed subscriber group in a subscriber identify module (SIM) or a universal subscriber identity module (USIM).

6. The UE device of claim 1, wherein the UE is further configured to operate both as a UE device and as a small cell base station.

7. The UE device of claim 1, wherein the small cell base station is a femtocell base station.

8. The UE device of claim 1, wherein the spectrum assignment is based on a spectrum assignment that was previously received by the small cell base station from the radio resource management system.

9. The UE device of claim 1, wherein the authorization signal is based on an authorization signal that was previously received by the small cell base station from the radio resource management system.

10. A User Equipment (UE) device configured to operate in a radio resource management system, the UE device comprising:
    means for receiving an authorization signal sent by a small cell base station;
    means for decoding the received authorization signal sent by the small cell base station, wherein the authorization signal includes a spectrum assignment and an output power limit for operation of the UE device, and wherein the spectrum assignment and output power limit for operation of the UE device are based on an interference metric reported by the UE device to the small cell base station; and
    means for causing the UE device to operate in a radio network using the assigned spectrum and output power limit.

11. The UE device of claim 10 further comprising means for causing the HE device to operate using a time division duplex (TDD) configuration that is based on a coexistence group in which the small cell base station is enrolled.

12. The UE device of claim 11, further comprising means for causing the UE device to operate in an interference coordination group that is part of the coexistence group.

13. The UE device of claim 12, wherein the interference coordination group is part of a closed subscriber group.

14. The UE device of claim 12, further comprising means for storing an identifier for the closed subscriber group in a subscriber identify module (SEW) or a universal subscriber identity module (USIM).

15. The UE device of claim 10, further comprising means for causing the UE device to operate both as a UE device and as a small cell base station.

* * * * *

UNITED STATES PATENT AND TRADEMARK OFFICE
CERTIFICATE OF CORRECTION

PATENT NO.        : 10,616,899 B2
APPLICATION NO.   : 15/861131
DATED             : April 7, 2020
INVENTOR(S)       : Mueck et al.

Page 1 of 1

It is certified that error appears in the above-identified patent and that said Letters Patent is hereby corrected as shown below:

In the Claims

In Column 38, Line 27, in Claim 11, delete "HE" and insert --UE-- therefor

In Column 38, Line 37, in Claim 14, delete "(SEW)" and insert --(SIM)-- therefor Signed and Sealed this
Twenty-third Day of June, 2020

Andrei Iancu
*Director of the United States Patent and Trademark Office*